United States Patent
Li

(10) Patent No.: US 10,979,899 B2
(45) Date of Patent: Apr. 13, 2021

(54) DATA COMMUNICATION METHOD AND SYSTEM

(71) Applicant: TENDYRON CORPORATION, Beijing (CN)

(72) Inventor: Ming Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 207 days.

(21) Appl. No.: 16/323,498

(22) PCT Filed: Aug. 4, 2017

(86) PCT No.: PCT/CN2017/095990
§ 371 (c)(1),
(2) Date: Feb. 5, 2019

(87) PCT Pub. No.: WO2018/024241
PCT Pub. Date: Feb. 8, 2018

(65) Prior Publication Data
US 2020/0382953 A1    Dec. 3, 2020

(30) Foreign Application Priority Data

Aug. 5, 2016  (CN) .......................... 201610639419.0
Aug. 5, 2016  (CN) .......................... 201610640012.X

(51) Int. Cl.
*H04L 29/06*    (2006.01)
*H04W 12/037*   (2021.01)
(Continued)

(52) U.S. Cl.
CPC ......... *H04W 12/037* (2021.01); *H04L 9/0637* (2013.01); *H04W 12/06* (2013.01); *H04W 12/10* (2013.01)

(58) Field of Classification Search
None
See application file for complete search history.

(56) References Cited

U.S. PATENT DOCUMENTS 4,641,325 A * 2/1987 Hughes .............. H04L 27/2273
                                                  327/162
6,459,744 B1 * 10/2002 Helard ................ H04L 5/0048
                                                  375/354

(Continued)

FOREIGN PATENT DOCUMENTS

CN    103353597 A    10/2013
CN    103870868 A    6/2014

OTHER PUBLICATIONS

Safie, Sairul et al. Comparison of Pulse Active (PA) modulation signal for Electrocardiogram (ECG) authentication. 2015 IEEE International Conference on Signal and Image Processing Applications (ICSIPA). https://ieeexplore.IEEE.org/stamp/stamp.jsp?tp=&arnumber=7412183 (Year: 2015).*

(Continued)

*Primary Examiner* — Jeremiah L Avery
(74) *Attorney, Agent, or Firm* — BakerHostetler

(57) ABSTRACT

The present disclosure relates to a data communication method and system. The method includes: a first terminal continuously generating a communication carrier signal; sending by the first terminal a communication data signal carrying a data packet to be processed, beginning to record the first number of pulses when the first terminal completes sending the data packet to be processed; receiving by the second terminal the communication data signal, beginning to record the second number of pulses when the second terminal completes receiving the data packet to be processed, generating a response data packet sending, by the second terminal, the response data packet to the first terminal when detecting that the second number reaches a pulse number threshold N; and allowing, by the first terminal, to begin receiving the response data packet when detecting that the first number is within a threshold range.

16 Claims, 3 Drawing Sheets

(51) Int. Cl.
   *H04L 9/06* (2006.01)
   *H04W 12/06* (2021.01)
   *H04W 12/10* (2021.01)

(56) References Cited

U.S. PATENT DOCUMENTS

| | | | | |
|---|---|---|---|---|
| 7,379,016 | B1* | 5/2008 | McEwan | G01S 17/14 |
| | | | | 342/134 |
| 2004/0242201 | A1* | 12/2004 | Sasakura | H04W 12/126 |
| | | | | 455/411 |
| 2011/0069738 | A1* | 3/2011 | Sugino | G01S 13/10 |
| | | | | 375/130 |
| 2012/0093209 | A1* | 4/2012 | Schmidt | H04L 27/2624 |
| | | | | 375/224 |
| 2013/0215788 | A1 | 8/2013 | He et al. | |
| 2015/0264570 | A1 | 9/2015 | Vaudenay et al. | |
| 2015/0381219 | A1* | 12/2015 | Kramer | H03F 1/02 |
| | | | | 375/297 |

OTHER PUBLICATIONS

Zhang, Wei et al. Aggregation Supportive Authentication in Wireless Sensor Networks: A Watermark Based Approach. 2007 IEEE International Symposium on a World of Wireless, Mobile and Multimedia Networks. https://ieeexplore.IEEE.org/stamp/stamp.jsp?tp=&arnumber=4351721 (Year: 2007).*

Xin, Wei; "Research on the Security and Privacy Issues in RFID-Based Supply Chain"; China Doctoral Dissertations; No. 10; Chapter 6; Oct. 2013; 27 pages (English Abstract).

Xin et al.; "Analysis and Design of Distance-Bounding Protocols for RFID"; Journal of Computer Research and Development; vol. 50(11); Nov. 2013; p. 2358-2366 (English Abstract).

International Patent Application No. PCT/CN2017/095990; Int'l Search Report; dated Oct. 27, 2017; 4 pages.

* cited by examiner

DATA COMMUNICATION METHOD AND SYSTEM

CROSS-REFERENCE TO RELATED APPLICATION

This application is a U.S. national phase application of International Application No. PCT/CN2017/095990 filed on Aug. 4, 2017, which claims priority to Chinese Patent Application No. 201610640012.X filed on Aug. 5, 2016, and Chinese Patent Application No. 201610639419.0 filed on Aug. 5, 2016.

FIELD

The present disclosure relates to the field of electronic technologies, and particular to, a data communication method and system.

BACKGROUND

The reading scheme of the existing contactless IC card reader performs data transmission based on communication protocols such as 14443 and 15693. According to the above protocols, a frame waiting time (FWT) exists after the reader sends instruction data, which indicates a maximum time range for the card reader to wait to receive response data from the card. That is, after the card reader sends an instruction to the card, the card reader waits to receive the response data from the card, and the card reader considers the returned data to be legal if the data is returned within the frame waiting time (FWT). According to the above communication protocols, if a third party intercepts the data sent by the card reader and returns the response data within the FWT time, the card reader will consider the source of the data to be reliable. Thus, the solution has security risks, such as being attacked by a third party and data being altered.

SUMMARY

The present disclosure aims to solve at least one of the above problems.

A main objective of the present disclosure is to provide a data communication method.

Another objective of the present disclosure is to provide a data communication system.

Another objective of the present disclosure is to provide another data communication method.

Another objective of the present disclosure is to provide another data communication system.

In order to achieve the above objectives, the technical solutions of the present disclosure may be described as follows.

In an aspect the present disclosure provides a data communication method, including: a first terminal continuously generating a communication carrier signal, and a second terminal receiving the communication carrier signal, during a communication between the first terminal and the second terminal. The method further includes: sending by the first terminal a communication data signal carrying a data packet to be processed, beginning by the first terminal to record the first number of pulses corresponding to the communication carrier signal sent by the first terminal when the first terminal completes sending the data packet to be processed; in which the communication data signal is obtained by the first terminal through modulating the data packet to be processed onto the communication carrier signal; receiving by the second terminal the communication data signal carrying the data packet to be processed, beginning by the second terminal to record the second number of pulses corresponding to the communication carrier signal received by the second terminal when the second terminal completes receiving the data packet to be processed, generating by the second terminal a response data packet based on the data packet to be processed; sending, by the second terminal, the response data packet to the first terminal when the recorded second number of pulses reaches a pulse number threshold N; and allowing, by the first terminal, to begin receiving the response data packet when the recorded first number of pulses reaches the pulse number threshold N.

In another aspect, the present disclosure further provides a data communication system, as least including a first terminal, and a second terminal. The first terminal continuously generates a communication carrier signal during communication with the second terminal. The first terminal is configured to send a communication data signal carrying a data packet to be processed, and begin to record the first number of pulses corresponding to the communication carrier signal sent by the first terminal when the first terminal completes sending the data packet to be processed; in which the communication data signal is obtained by the first terminal through modulating the data packet to be processed onto the communication carrier signal; the second terminal is configured to receive the communication data signal carrying the data packet to be processed, begin to record the second number of pulses corresponding to the communication carrier signal received by the second terminal when the second terminal completes receiving the data packet to be processed, and generate a response data packet based on the data packet to be processed; the second terminal is configured to send the response data packet to the first terminal when the recorded second number of pulses reaches a pulse number threshold N. and the first terminal is configured to allow to begin receiving the response data packet when the recorded first number of pulses reaches the pulse number threshold N.

It can be seen from the above technical solutions provided in the present disclosure that, with the data communication method and system provided in the present disclosure, the first terminal begins to record the first number of pulses corresponding to the communication carrier signal sent by the first terminal when the first terminal completes sending the data packet to be processed, and receives the response data packet when the first number of pulses reaches the pulse number threshold N; the second terminal begins to record the second number of pulses corresponding to the communication carrier signal received by the second terminal when the second terminal completes receiving the data packet to be processed, and sends the response data packet to the first terminal when the second number of pulses reaches the pulse number threshold N. Therefore, simultaneous receiving and sending through detecting the numbers of pulses by the first terminal and by the second terminal greatly improves the timing accuracy of the two parties, thus ensuring that the first terminal and the second terminal receive and send response data packets only at a particular moment of high precision. That is, even if the response data packet sent by the second terminal to the first terminal is intercepted by a third party during the transmission, the first terminal has already terminated the communication process when the data tampered by the third party reaches the first terminal, this is because the third party tampers with the data at millisecond level, which is far greater than the timing accuracy of the first terminal, and the first terminal immediately stops the communication if not receiving the response data packet at the particular moment, thereby greatly improving the reliability of the received response data packet.

In another aspect, the present disclosure further provides another data communication method, including: a first terminal continuously generating a communication carrier signal, and a second terminal receiving the communication carrier signal, during a communication between the first terminal and the second terminal. The method includes: sending by the first terminal a communication data signal carrying a data packet to be processed, beginning by the first terminal to record the first number of pulses corresponding to the communication carrier signal sent by the first terminal when the first terminal completes sending the data packet to be processed; in which the communication data signal is obtained by the first terminal through modulating the data packet to be processed onto the communication carrier signal; receiving by the second terminal the communication data signal carrying the data packet to be processed, beginning by the second terminal to record the second number of pulses corresponding to the communication carrier signal received by the second terminal when the second terminal completes receiving the data packet to be processed, generating by the second terminal a response data packet based on the data packet to be processed; sending, by the second terminal, the response data packet to the first terminal when detecting that the second number of pulses reaches a pulse number threshold N; and allowing, by the first terminal, to begin receiving the response data packet when detecting that the first number of pulses is within a threshold range, wherein the threshold range is obtained by the first terminal based on the pulse number threshold N.

In another aspect, the present disclosure further provides a data communication system, as least including a first terminal, and a second terminal. The first terminal continuously generating a communication carrier signal during communication with the second terminal. The first terminal is configured to send a communication data signal carrying a data packet to be processed, and begin to record the first number of pulses corresponding to the communication carrier signal sent by the first terminal when the first terminal completes sending the data packet to be processed; in which the communication data signal is obtained by the first terminal through modulating the data packet to be processed onto the communication carrier signal; the second terminal is configured to receive the communication data signal carrying the data packet to be processed, begin to record the second number of pulses corresponding to the communication carrier signal received by the second terminal when the second terminal completes receiving the data packet to be processed, and generate a response data packet based on the data packet to be processed; the second terminal is configured to send the response data packet to the first terminal when detecting that the second number of pulses reaches a pulse number threshold N; the first terminal is configured to allow to begin receiving the response data packet when detecting that the first number of pulses is within a threshold range, wherein the threshold range is obtained by the first terminal based on the pulse number threshold N.

It can be seen from the above technical solutions provided in the present disclosure that, with the data communication method and system provided in the present disclosure, the first terminal begins to record the first number of pulses corresponding to the communication carrier signal sent by the first terminal when the first terminal completes sending the data packet to be processed, and receives the response data packet when the first number of pulses is within the threshold range; the second terminal begins to record the second number of pulses corresponding to the communication carrier signal received by the second terminal when the second terminal completes receiving the data packet to be processed, and sends the response data packet to the first terminal when the second number of pulses reaches the pulse number threshold N. Therefore, simultaneous receiving and sending through detecting the numbers of pulses by the first terminal and by the second terminal greatly improves the timing accuracy of the two parties, thus ensuring that the first terminal and the second terminal receive and send response data packets only at a particular moment of high precision. That is, even if the response data packet sent by the second terminal to the first terminal is intercepted by a third party during the transmission, the first terminal has already terminated the communication process when the data tampered by the third party reaches the first terminal, this is because the third party tampers with the data at millisecond level, which is far greater than the timing accuracy of the first terminal, and the first terminal immediately stops the communication if not receiving the response data packet at the particular moment, thereby greatly improving the reliability of the received response data packet.

BRIEF DESCRIPTION OF THE DRAWINGS

To describe the technical solutions in the embodiments of the present disclosure more clearly, the accompanying drawings required for describing the embodiments are introduced briefly in the following. Obviously, the accompanying drawings in the following description are only some embodiments of the present disclosure, and those skilled in the art may also derive other drawings from these accompanying drawings without creative efforts.

DETAILED DESCRIPTION

The technical solutions in the embodiments of the present disclosure are clearly and completely described in the following with reference to the accompanying drawings in the embodiments of the present disclosure. Obviously, the embodiments in the following description are merely a part rather than all of the embodiments of the present disclosure. Based on the embodiments of the present disclosure, all other embodiments obtained by those skilled in the art without creative efforts shall fall within the protection scope of the present disclosure.

In the following, the embodiments of the present disclosure will be described in detail with reference to the accompanying drawings.

Embodiment 1

The embodiment provides a data communication method. During communication between a first terminal and a second terminal, the first terminal continuously generates a communication carrier signal. In communication technology, a communication carrier signal is a radio wave generated by an oscillator and transmitted over a communication channel, and is modulated to transmit data. In this embodiment, the communication carrier is generated by the first terminal as a carrier tool for transmitting data information.

Figure 1:
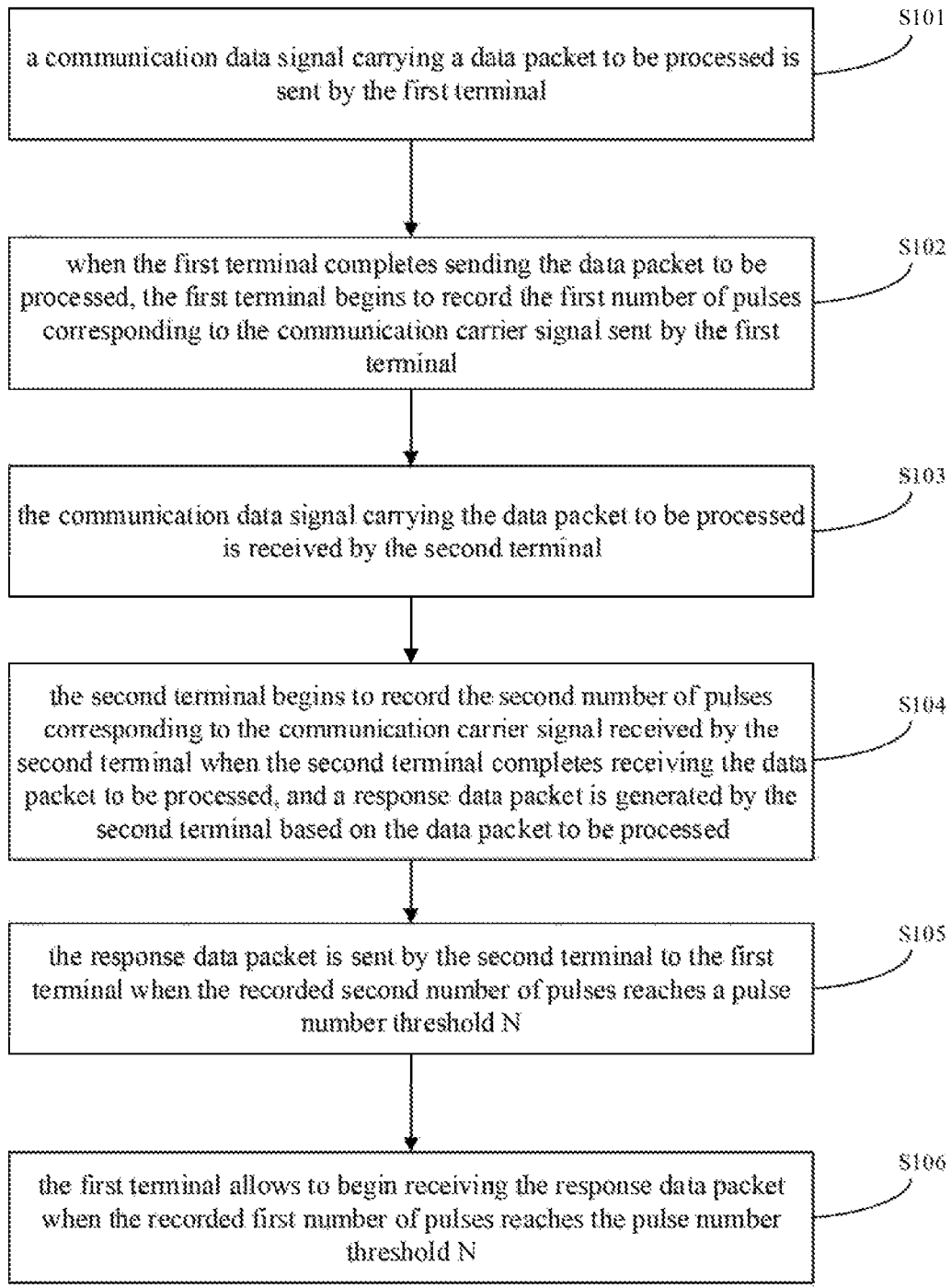
FIG. 1 is a flow chart of a data communication method according to embodiment 1 of the present disclosure.

As illustrated in FIG. 1, embodiment 1 comprises actions in the following blocks.

At block S101, a communication data signal carrying a data packet to be processed is sent by the first terminal.

The communication data signal is obtained by the first terminal by means of modulating the data packet to be processed onto the communication carrier signal. The communication carrier signal is an unmodulated periodic oscillating signal, which is either a sine wave or a non-sinusoidal wave (such as a periodic pulse sequence). The signal generated after modulating the data packet to be processed onto the communication carrier signal is called as the communication data signal, which may contain the full-wave characteristics of the data packet to be processed. Generally, the frequency of the communication carrier signal is required to be much higher than the bandwidth of the modulated signal of the data packet to be processed, otherwise aliasing may occur and the transmission signal may be distorted. Using the communication data signal for transmission, the first terminal loads the signal of the data packet to be processed onto the communication carrier signal for data transmission, thus ensuring correct outgoing transmission of the data packet to be processed.

At block S102, when the first terminal completes sending the data packet to be processed, the first terminal begins to record the first number of pulses corresponding to the communication carrier signal sent by the first terminal; the communication data signal is obtained by the first terminal through modulating the data packet to be processed onto the communication carrier signal.

In the field of communication, a pulse signal is a discrete signal that can take many forms, such as a sharp pulse signal, a triangular wave pulse signal. Compared with the ordinary analog signal, the waveform of the pulse signal is discontinuous in the time axis, and there is a clear interval between one waveform and the other, but it has a certain periodicity. The most common pulse signal is a rectangular wave signal, i.e., a square wave signal, which is expressed as periodic high-power levels or periodic low-power levels. In this embodiment, the first terminal and the second terminal perform timing for signal transmission and reception by recording the number of pulses of the pulse signal. When the first terminal completes sending the data packet to be processed, the number of pulses corresponding to the communication carrier signal is recorded in real time from the number 0, thereby obtaining the first number of pulses corresponding to the communication carrier signal sent by the first terminal in real time. Alternatively, when the first terminal completes sending the data packet to be processed, the current number of pulses is detected by a pulse detecting component inside the first terminal, and the current number of pulses is arranged as the first beginning number of pulses, then it begins to detect the change in the number of pulses corresponding to the communication carrier signal in real time, thereby obtaining the difference value of the pulses corresponding to the communication carrier signal relative to the first beginning number of pulses in real time. The change speed of the number of pulses corresponding to the communication carrier signal is positively correlated with the frequency of the communication carrier signal. By detecting the first number of pulses corresponding to the communication carrier signal sent by the first terminal at a certain time moment T, it is possible to accurately record the time interval between the time moment T and the time moment when the first terminal completes sending the data packet to be processed based on the number of pulses. For example, when the frequency of the communication carrier signal is V, the duration of one cycle is l/v, i.e., the interval between two adjacent pulses is l/v. The frequency of the communication carrier signal is generally extremely high, for example, 13.56 MHz, 2.4 GHz. When the communication carrier signal is used at a frequency of 2.4 GHz, the interval between two adjacent pulses is about 0.4 nanoseconds. Consequently, the first terminal detects the time interval by measuring the change of the number of pulses corresponding to the communication carrier signal, which greatly improves the detection accuracy.

At block S103, the communication data signal carrying the data packet to be processed is received by the second terminal.

The second terminal receives the data signal of the data packet to be processed according to the frequency of the communication carrier signal. The amplitude of a meaningful signal wave is different from the amplitude of a meaningless signal wave. The valid signal is extracted as the required data signal of the data packet to be processed, thereby efficiently obtaining the data packet to be processed.

At block S104, the second terminal begins to record the second number of pulses corresponding to the communication carrier signal received by the second terminal when the second terminal completes receiving the data packet to be processed, and a response data packet is generated by the second terminal based on the data packet to be processed.

When the second terminal completes receiving the data packet to be processed, the number of pulses of the communication carrier signal is recorded in real time from the number 0, thereby obtaining the second number of pulses corresponding to the communication carrier signal received by the second terminal in real time. Alternatively, when the second terminal completes receiving the data packet to be processed, the current number of pulses is detected by a pulse detecting component inside the second terminal, and the current number of pulses is arranged as the second beginning number of pulses, then it begins to detect the change in the number of pulses corresponding to the communication carrier signal in real time, thereby obtaining the difference value of the pulses corresponding to the communication carrier signal relative to the second beginning number of pulses in real time, and the received data packet to be processed is processed to generate the response data packet. The second terminal performs timing by detecting the communication carrier signal sent by the first terminal, and the time-interval measurement can be realized without arranging the components such as a timer, a crystal oscillator, a power source in the second terminal, thereby reducing the production cost of the second terminal. By detecting the second number of pulses corresponding to the communication carrier signal received by the second terminal at a certain time moment T, it is possible to accurately record the time interval between the time moment T and the time moment when the second terminal completes receiving the data packet to be processed based on the number of pulses. For example, when the frequency of the communication carrier signal is V, the duration of one cycle is l/v, i.e., the interval between two adjacent pulses is l/v. The frequency of the communication carrier signal is generally extremely high, for example, 13.56 MHz, 2.4 GHz. When the communication carrier signal is used at a frequency of 2.4 GHz, the interval between two adjacent pulses is about 0.4 nanoseconds. Consequently, the second terminal detects the time interval by measuring the change of the number of pulses corresponding to the communication carrier signal, which greatly improves the detection accuracy.

The first terminal and the second terminal perform time detection based on the number of pulses corresponding to the same communication carrier signal. After completing sending the data packet to be processed, the first terminal begins to detect the number change of pulses corresponding to the communication carrier signal at the time moment T1. After completing receiving the data packet to be processed, the second terminal begins to detect the number change of pulses corresponding to the communication carrier signal at the time moment T2. T2=T1+ΔT1+ΔT2. The first terminal splits the data packet to be processed into x data blocks for transmission, in which ΔT1 is the transmission duration between the first terminal and the second terminal of the $x^{th}$ data block in the data packet to be processed, and ΔT2 is the time difference between the time moment when the $x^{th}$ data block arrives at the second terminal and the time moment when the second terminal completes receiving the $x^{th}$ data block in the data packet to be processed. The data packet to be processed is transmitted at the speed of light during transmission. The transmission time duration ΔT1 of the last data block in the data packet to be processed is the ratio of the transmission distance S to the speed of light C, i.e., ΔT1=S/C. Since C=3×10$^8$ m/s, ΔT1 is a minimum value. Generally, in the process of data packet interaction, the data packet to be transmitted is split into multiple data blocks for transmission. In this embodiment, it is assumed that the data packet to be transmitted is split into x data blocks for transmission. Before the first terminal completes sending the last data block, i.e., the $x^{th}$ data block, the second terminal has begun to receive the first data block in the data packet to be processed. At the time moment T1+ΔT1, the second terminal completes receiving x−1 data blocks in the data packet to be processed. ΔT2 is the time difference between the time moment when the $x^{th}$ data block arrives at the second terminal and the time moment when the second terminal completes receiving the $x^{th}$ data block in the data packet to be processed. Consequently, ΔT2 is also a minimum value. Therefore, in the communication method provided in this embodiment, the first terminal and the second terminal can be equivalently regarded as timing based on the communication carrier signal at the same time, which ensures the synchronization and accuracy of the timing results of both terminals.

After receiving the data packet to be processed, the second terminal performs an authentication operation on the data packet to be processed. After the authentication succeeds, the key information is extracted from the data packet to be processed, and the key information is processed to generate the response data packet. For example, in the transaction communication, after receiving the data packet to be processed, the second terminal performs the authentication operation on the data packet to be processed to confirm the legal identity of the first terminal. The key information such as a transaction account and a transaction amount are extracted from the data packet to be processed and displayed to a user. After the user confirms, the second terminal uses the second terminal private key to perform a signature operation on the key information to generate signature data, and generates the response data packet based on the signature data and the certificate of the second terminal, thereby ensuring communication security.

At block S105, the response data packet is sent by the second terminal to the first terminal when the recorded second number of pulses reaches a pulse number threshold N.

The second terminal detects in real time the change difference of the number of pulses corresponding to the communication carrier signal at the current time moment relative to the second beginning number of pulses. When the change difference reaches the pulse number threshold N, the second terminal sends the generated response data packet to the first terminal. The pulse number threshold N can be stored in the factory preconfigured information for the first terminal and the second terminal, or the pulse number threshold N may be negotiated for the first terminal and the second terminal, or the pulse number threshold N may be carried in the communication protocol of the first terminal and the second terminal, in which, alternatively ω≤N≤λ, ω is a change value in the number of pulses generated when the communication carrier signal goes through a predetermined completion time period of processing by the second terminal the received data from the first terminal. The predetermined completion time period refers to the maximum time period required for the second terminal to process the data sent by the first terminal. N≥ω ensures that the second terminal completes the processing of the data packet to be processed and generating the response data packet before the response data packet needs to be sent, thereby ensuring normal communication between the first terminal and the second terminal. λ is a change value in the number of pulses generated when the communication carrier signal goes through a frame waiting time defined by the communication protocol adopted by the first terminal and the second terminal. The frame waiting time refers to the effective waiting time after the data packet to be processed is sent, which is defined in the communication protocol. Communication fails after frame waiting time. The communication protocol adopted by the first terminal and the second terminal may be a currently general communication protocol and a communication protocol that may occur in the future, such as ISO14443 communication protocol and ISO15693 communication protocol. N≤λ ensures that the second terminal sends the response data packet to the first terminal within the frame waiting time, which is compatible with the existing communication protocol, and ensures normal communication between the first terminal and the second terminal under the existing communication protocol. The second terminal detects the number of pulses and sends the response data packet when the second number of pulses reaches the pulse number threshold N, so that the response data packet is sent only at a specified time moment, meanwhile the accuracy of the time that sends the response data packet is ensured.

At block S106, the first terminal allows to begin receiving the response data packet when the recorded first number of pulses reaches the pulse number threshold N.

In this embodiment, the first terminal and the second terminal communicate with each other by using short distance wireless communication, which includes: Bluetooth communication protocol, IrDA (Infrared Data Association) communication protocol, RFID (Radio Frequency Identification) communication protocol, ZigBee communication protocol, Ultra WideBand communication protocol, near field communication (NFC) communication protocol, WiMedia communication protocol, GPS (Global Positioning System) communication protocol, DECT (Digital Enhanced Cordless Telecommunications) communication protocol, 1394 wireless communication protocol and dedicated wireless communication protocol. With the above short distance wireless communication, the distance between the first terminal and the second terminal is negligible with respect to the transmission distance of the data signal per unit time. For example, with the Bluetooth communication protocol, the distance between the first terminal and the second terminal is less than 10 meters, and the data between the first terminal and the second terminal is wirelessly transmitted at the speed of light. In this short distance wireless communication, the data transmission time duration between the first terminal and the second terminal is extremely short, about 30 ns, which can be negligible. That is, after the first terminal sends the data packet, the second terminal can immediately receive the data packet. When the first terminal receives the response data packet that is sent by the second terminal when the second number of pulses reaches the pulse number threshold N, the first number of pulses detected by the first terminal is also N; the first terminal only allows to begin receiving the response data packet when detecting that the first number of pulses reaches the pulse number threshold N. Otherwise, the first terminal is not allowed to receive externally transmitted data information, which greatly improves the reliability of the received response data packet. In this embodiment, the first terminal and the second terminal may be any device capable of data interaction communication. Alternatively, the first terminal may be a reader, including a card reader, a computer, a mobile phone, a router, an in-vehicle device, a server, etc. The second terminal may be a transponder, including a smart card, an ID card, a smart key device, a mobile phone, a computer, a router, a smart home, a wearable device, etc. In the process of data communication, the first terminal and the second terminal simultaneously improve the timing accuracy by detecting the numbers of pulses, thereby ensuring that the first terminal and the second terminal only send and receive response data packets at a particular moment of high precision. Even if the response data packet sent by the second terminal to the first terminal is intercepted by the third party during the transmission, the first terminal has already terminated the communication process when the data tampered by the third party reaches the first terminal, this is because the third party tampers with the data at millisecond level, which is far greater than the timing accuracy of the first terminal, and the first terminal immediately stops the communication if not receiving the response data packet at the particular moment, thereby greatly improving the reliability of the received response data packet.

Figure 2:
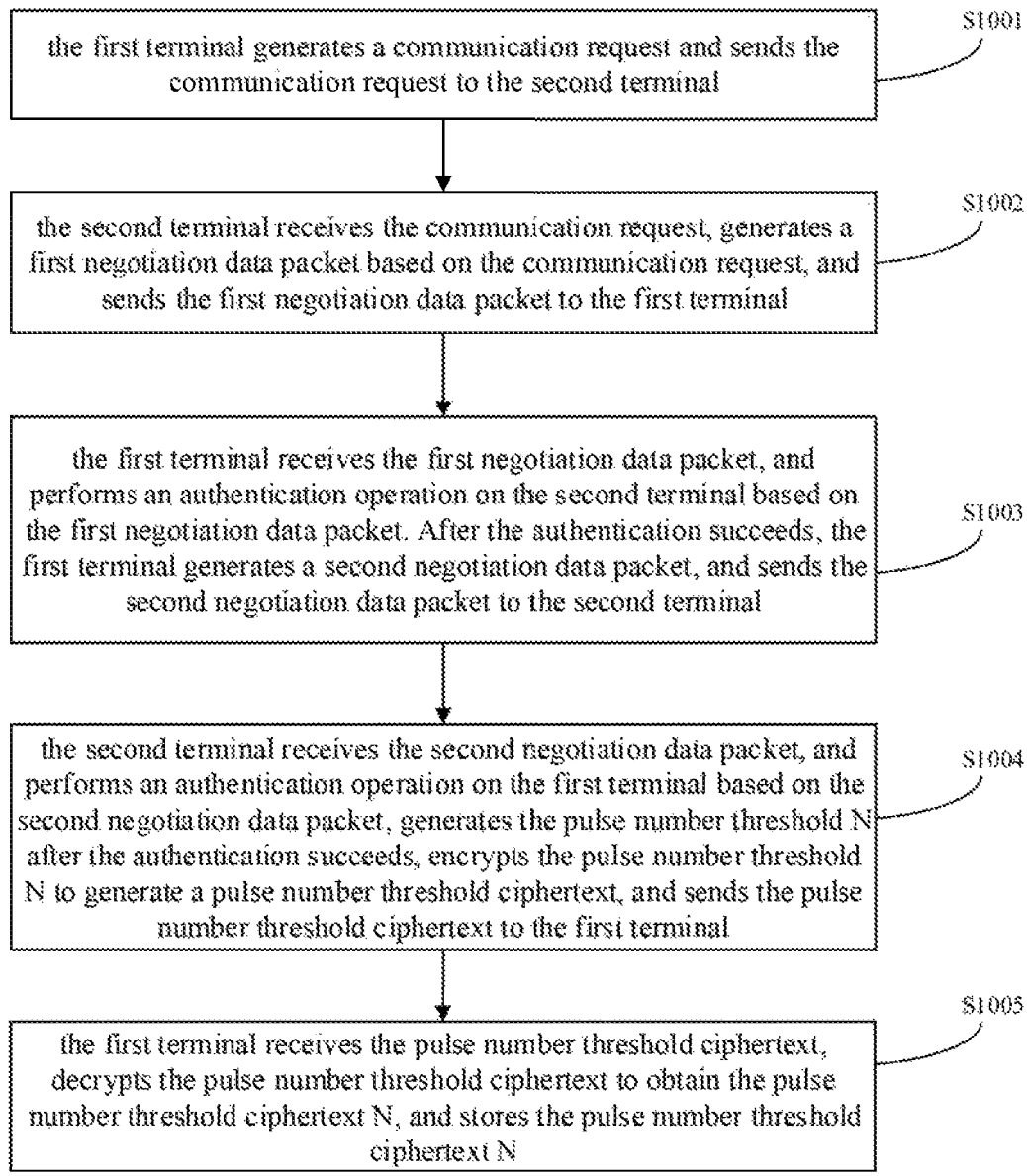
FIG. 2 is a flow chart of a method for negotiating a pulse number threshold according to embodiment 1 of the present disclosure.

Alternatively, at block S101, before the rust terminal sends the communication data signal carrying the data packet to be processed, as illustrated in FIG. 2, the method further includes the actions in the following blocks.

At block 1001, the first terminal generates a communication request and sends the communication request to the second terminal.

At block 1002, the second terminal receives the communication request, generates a first negotiation data packet based on the communication request, and sends the first negotiation data packet to the first terminal.

At block 1003, the first terminal receives the first negotiation data packet, and performs an authentication operation on the second terminal based on the first negotiation data packet. After the authentication succeeds, the first terminal generates a second negotiation data packet, and sends the second negotiation data packet to the second terminal.

At block 1004, the second terminal receives the second negotiation data packet, and performs an authentication operation on the first terminal based on the second negotiation data packet, generates the pulse number threshold N after the authentication succeeds, encrypts the pulse number threshold N to generate a pulse number threshold ciphertext, and sends the pulse number threshold ciphertext to the first terminal, in which $N \leq \lambda$ and $\lambda$ is the number of pulses generated when the communication carrier signal goes through a frame waiting time defined by the communication protocol adopted by the first terminal and the second terminal.

A frame waiting time refers to the effective waiting time after the data packet to be processed is sent, which is defined in the communication protocol. Communication fails after frame waiting time. $N \leq \lambda$ ensures that the second terminal sends the response data packet to the first terminal within the frame waiting time, which is compatible with the existing communication protocol, and ensures normal communication between the first terminal and the second terminal under the existing communication protocol.

Alternatively $\omega \leq N \leq \lambda$, wherein, $\omega$ is a change value in the number of pulses generated when the communication carrier signal goes through a predetermined completion time period of processing by the second terminal the received data from the first terminal. The first terminal can obtain $\omega$ in a variety of ways, including but not being limited to the following: $\omega$ can be obtained by the first terminal from external key input, $\omega$ can be obtained when the second terminal sends it to the first terminal, $\omega$ can be obtained from scanning code by the first terminal, $\omega$ can be obtained from the factory preconfigured information by the first terminal. $N \geq \omega$ ensures that the second terminal completes processing of the data packet to be processed and generating the response data packet before the response data packet needs to be sent, thereby ensuring normal communication between the first terminal and the second terminal.

At block 1005, the first terminal receives the pulse number threshold ciphertext, decrypts the pulse number threshold ciphertext to obtain the pulse number threshold ciphertext N, and stores the pulse number threshold ciphertext N.

Blocks S1001 to S1005 may include, but are not limited to, the following three implementations provided by this embodiment.

Implementation 1:

The first terminal generates a first random number and sends the first random number to the second terminal.

The first random number may be generated by the first terminal according to an external random noise signal, or may be generated by the first terminal according to an internal random number generator, to ensure external unreachability of the first random number.

The second terminal receives the first random number, generates a second random number, performs a signature operation on the first random number by using the second terminal private key to generate first signature information, and sends the first negotiation data packet to the first terminal, in which the first negotiation data packet includes at least: a CA (Certificate Authority) certificate of the second terminal, the first signature information, and the second random number.

The second random number may be generated by the second terminal according to an external random noise signal, or may be generated by the second terminal according to an internal random number generator, to ensure external unreachability of the second random number. The second terminal performs a signature operation on the first random number based on the private key thereof, and sends the CA certificate of the second terminal to the first terminal, so that the first terminal may authenticate the legality of the second terminal.

The first terminal receives the first negotiation data packet, and performs an authentication operation on the CA certificate of the second terminal, obtains the second terminal public key after the authentication succeeds, performs a verification operation on the first signature information based on the second terminal public key, performs a signature operation on the second random number by using the first terminal private key after the verification succeeds to generate second signature information, and sends the second negotiation data packet to the second terminal, in which the second negotiation data packet includes at least: the CA certificate of the first terminal, and the second signature information.

The first terminal performs an identity authentication on the second terminal based on the second terminal public key to ensure the legality of the second terminal. After the authentication succeeds, the first terminal performs a signature operation on the second random number based on the private key, and sends the CA certificate of the rust terminal to the second terminal, so that the second terminal authenticates the legality of the first terminal.

The second terminal receives the second negotiation data packet, and performs an authentication operation on the CA certificate of the first terminal, obtains the first terminal public key after the authentication succeeds, performs a verification operation on the second signature information based on the first terminal public key, generates the pulse number threshold N after the verification succeeds, encrypts the pulse number threshold N by using the first terminal public key to generates a pulse number threshold ciphertext, and sends the pulse number threshold ciphertext to the first terminal.

The second terminal performs an identity authentication on the first terminal based on the first terminal public key to ensure the legality of the first terminal. After the authentication succeeds, the second terminal generates the pulse number threshold N, encrypts the pulse number threshold N by using the first terminal public key to generate the pulse number threshold ciphertext. The pulse number threshold ciphertext generated by the encryption on the pulse number threshold by using the first terminal public key, can only be decrypted by using the first terminal private key, and the first terminal private key is stored in the first terminal security chip and cannot be obtained by the external terminal, thereby ensuring the security of the pulse number threshold N.

The first terminal receives the pulse number threshold ciphertext, and decrypts the pulse number threshold ciphertext by using the first terminal private key to obtain the pulse number threshold N and store the pulse number threshold N.

The first terminal decrypts the pulse number threshold ciphertext by using the first terminal private key to obtain the pulse number threshold N and store the pulse number threshold N, which realizes the negotiation of the pulse number threshold N between the first terminal and the second terminal, thereby ensuring the security of the negotiation process.

Implementation 2:

The first terminal generates a first random number and sends the first random number and a CA certificate of the first terminal to the second terminal.

The first random number may be generated by the first terminal according to an external random noise signal, or may be generated by the first terminal according to an internal random number generator, to ensure external unreachability of the first random number.

The second terminal receives the first random number and the CA certificate of the first terminal; generates a second random number; performs an authentication operation on the CA certificate of the first terminal; after the authentication succeeds, obtains the first terminal public key and performs a signature operation on the first random number by using the second terminal private key to generate the first signature information; encrypts the second random number by using the first terminal public key to generate the second random number ciphertext; and sends the first negotiation information to the first terminal, in which the first negotiation information includes at least: a CA certificate of the second terminal, the first signature information, and the second random number ciphertext.

The second random number may be generated by the second terminal according to an external random noise signal, or may be generated by the second terminal according to an internal random number generator, to ensure external unreachability of the second random number. The second terminal obtains the first terminal public key based on the CA certificate of the first terminal, and encrypts the second random number by using the first terminal public key. The second random number ciphertext generated by encryption through using the first terminal public key can only be decrypted by using the first terminal private key, and the first terminal private key is stored in the first terminal security chip and cannot be obtained by the external terminal, thereby ensuring the security of the second random number.

The first terminal receives the first negotiation data packet, and performs an authentication operation on the CA certificate of the second terminal; after the authentication succeeds, performs a verification operation on the first signature information based on the second terminal public key; after the verification succeeds, encrypts the second random number ciphertext by using the first terminal private key to obtain the second random number; performs a signature operation on the second random number by using the first terminal private key to generate the second signature information; generates the third random number, encrypts the third random number by using the second terminal public key to obtain the third random number ciphertext; obtains the transmission key according to the first predetermined algorithm based on the second random number and the third random number, and sends the second negotiation information to the second terminal, in which the second negotiation information includes at least: the second signature information, and the third random number ciphertext.

The first terminal performs an identity authentication on the second terminal based on the second terminal public key to ensure the legality of the second terminal; after the authentication succeeds, encrypts the second random number ciphertext by using the first terminal private key to obtain the second random number; generates the third random number; obtains the transmission key according to the first predetermined algorithm based on the second random number and the third random number, in which the third random number may be generated by the first terminal according to an external random noise signal, or may be generated by the first terminal according to an internal random number generator, to ensure external unreachability of the second random number; encrypts the third random number by using the second terminal public key. The third random number ciphertext generated by encryption through using the second terminal public key can only be decrypted by using the second terminal private key, and the second terminal private key is stored in the second terminal security chip and cannot be obtained by the external terminal, thereby ensuring the security of the third random number.

The second terminal receives the second negotiation data packet, and performs a verification operation on the second signature information based on the first terminal public key; after the verification succeeds, decrypts the third random number ciphertext by using the second terminal private key to obtain the third random number; obtains the transmission key according to the first predetermined algorithm based on the second random number and the third random number. The second terminal generates the transmission key generation feedback information, and sends the transmission key generation feedback information to the first terminal.

The second terminal decrypts the third random number ciphertext by using the second terminal private key to obtain the third random number; obtains the transmission key according to the first predetermined algorithm based on the second random number and the third random number. The first terminal and the second terminal respectively obtain the transmission key according to the first predetermined algorithm based on the second random number and the third random number, which not only ensures that the two sides negotiate the same transmission key, but also does not need to send the transmission key, thereby avoiding the leakage of the transmission key during the communication process and improving the security of the communication.

The first terminal receives the transmission key generation feedback information, generates the pulse number threshold N, encrypts the pulse number threshold N by using the transmission key to generate the pulse number threshold ciphertext, and sends the pulse number threshold ciphertext to the second terminal.

The first terminal generates the pulse number threshold N, and encrypts the pulse number threshold N by using the transmission key to generate the pulse number threshold ciphertext. The transmission key is respectively obtained by the first terminal and the second terminal based on the second random number and the third random number according to the first predetermined algorithm, and is only stored inside the first terminal and the second terminal, which cannot be obtained by the external terminal, thereby ensuring the security of the pulse number threshold N.

The second terminal receives the pulse number threshold ciphertext, and decrypts the pulse number threshold ciphertext by using the second terminal private key to obtain the pulse number threshold N. and stores the pulse number threshold N.

The second terminal decrypts the pulse number threshold ciphertext by using the transmission key to obtain the pulse number threshold N, and stores the pulse number threshold N, which realizes the negotiation of the pulse number threshold N between the first terminal and the second terminal, thereby ensuring the security of the negotiation process.

Implementation 3:

The first terminal generates a first random number and sends the first random number and a CA certificate of the first terminal to the second terminal.

The first random number may be generated by the first terminal according to an external random noise signal, or may be generated by the first terminal according to an internal random number generator, to ensure external unreachability of the first random number.

The second terminal receives the first random number and the CA certificate of the first terminal; generates a second random number; performs an authentication operation on the CA certificate of the first terminal; after the authentication succeeds, obtains the first terminal public key and performs a signature operation on the first random number by using the second terminal private key to generate the first signature information; encrypts the second random number by using the first terminal public key to generate the second random number ciphertext; and sends the first negotiation information to the first terminal, in which the first negotiation information includes at least: a CA certificate of the second terminal, the first signature information, and the second random number ciphertext.

The second random number may be generated by the second terminal according to an external random noise signal, or may be generated by the second terminal according to an internal random number generator, to ensure external unreachability of the second random number. The second terminal obtains the first terminal public key based on the CA certificate of the first terminal, and encrypts the second random number by using the first terminal public key. The second random number ciphertext generated by encryption through using the first terminal public key can only be decrypted by using the first terminal private key, and the first terminal private key is stored in the first terminal security chip and cannot be obtained by the external terminal, thereby ensuring the security of the second random number.

The first terminal receives the first negotiation data packet, and performs an authentication operation on the CA certificate of the second terminal; after the authentication succeeds, performs a verification operation on the first signature information based on the second terminal public key; after the verification succeeds, encrypts the second random number ciphertext by using the first terminal private key to obtain the second random number; performs a signature operation on the second random number by using the first terminal private key to generate the second signature information; generates the third random number, encrypts the third random number by using the second terminal public key to obtain the third random number ciphertext; obtains the transmission key according to the first predetermined algorithm based on the second random number and the third random number; and sends the second negotiation information to the second terminal, in which the second negotiation information includes at least: the second signature information, and the third random number ciphertext.

The first terminal performs an identity authentication on the second terminal based on the second terminal public key to ensure the legality of the second terminal; after the authentication succeeds, encrypts the second random number ciphertext by using the first terminal private key to obtain the second random number; generates the third random number; obtains the transmission key according to the first predetermined algorithm based on the second random number and the third random number, in which the third random number may be generated by the first terminal according to an external random noise signal, or may be generated by the first terminal according to an internal random number generator, to ensure external unreachability of the second random number; encrypts the third random number by using the second terminal public key. The third random number ciphertext generated by encryption through using the second terminal public key can only be decrypted by using the second terminal private key, and the second terminal private key is stored in the second terminal security chip and cannot be obtained by the external terminal, thereby ensuring the security of the third random number.

The second terminal receives the second negotiation data packet, and performs a verification operation on the second signature information based on the first terminal public key; after the verification succeeds, decrypts the third random number ciphertext by using the second terminal private key to obtain the third random number; obtains the transmission key according to the first predetermined algorithm based on the second random number and the third random number. The second terminal generates the pulse number threshold N, decrypts the pulse number threshold N by using the transmission key to generate the pulse number threshold ciphertext and sends the pulse number threshold ciphertext to the first terminal.

The second terminal decrypts the third random number ciphertext by using the second terminal private key to obtain the third random number, and obtains the transmission key according to the first predetermined algorithm based on the second random number and the third random number. The first terminal and the second terminal respectively obtain the transmission key according to the first predetermined algorithm based on the second random number and the third random number, which not only ensures that the two sides negotiate the same transmission key, but also does not need to send the transmission key, thereby avoiding the leakage of the transmission key during the communication process and improving the security of the communication. The second terminal generates the pulse number threshold N, encrypts the pulse number threshold N by using the transmission key to generate the pulse number threshold ciphertext. The transmission key is respectively obtained by the first terminal and the second terminal based on the second random number and the third random number according to the first predetermined algorithm, and is only stored inside the first terminal and the second terminal, which cannot be obtained by the external terminal, thereby ensuring the security of the pulse number threshold N.

The first terminal receives the pulse number threshold ciphertext, decrypts the pulse number threshold ciphertext by using the transmission key to obtain the pulse number threshold N, and stores the pulse number threshold N.

The first terminal decrypts the pulse number threshold ciphertext by using the transmission key to obtain the pulse number threshold N. and stores the pulse number threshold N, which realizes the negotiation of the pulse number threshold N between the first terminal and the second terminal, meanwhile ensures the security of the negotiation process.

Through the negotiation process of the pulse number threshold N, the security of the pulse number threshold N can be ensured, and the pulse number threshold N is prevented from being externally tampered. Furthermore, the negotiation process of the pulse number threshold N can be negotiated before each information interaction, thereby further ensuring the security of the pulse number threshold N.

Alternatively, the pulse number threshold N is stored in the factory preconfigured information of the first terminal and of the second terminal, in which $N \leq \lambda$ and $\lambda$ is the number of pulses generated when the communication carrier signal goes through a frame waiting time defined by a communication protocol adopted by the first terminal and the second terminal.

By storing the pulse number threshold N in the factory preconfigured information of the first terminal and of the second terminal, it is possible to realize that the pulse number threshold N is not required to be transmitted between the first terminal and the second terminal. Therefore, the pulse number threshold N is prevented from being intercepted externally during transmission, which ensures the security of the pulse number threshold N. $\lambda$ is the change value in the number of pulses generated when the communication carrier signal goes through a frame waiting time defined by the communication protocol adopted by the first terminal and the second terminal. A frame waiting time refers to the effective waiting time after the data packet to be processed is sent, which is defined in the communication protocol. Communication fails after frame waiting time. $N \leq \lambda$ ensures that the second terminal sends the response data packet to the first terminal within the frame waiting time, which is compatible with the existing communication protocol, and ensures normal communication between the first terminal and the second terminal under the existing communication protocol.

Alternatively, the first terminal and the second terminal perform data interaction based on a pulse communication protocol, and perform a verification operation on the received pulse number threshold N based on a tamper-proof check value, in which the pulse communication protocol is a communication protocol in which transmission data at least includes the pulse number threshold N; or the pulse communication protocol is a communication protocol in which transmission data at least includes the pulse number threshold N and the tamper-proof check value. The tamper-proof check value is configured to perform the verification operation on the pulse number threshold N.

The communication protocol adopted by the first terminal and the second terminal may define that the pulse number threshold N is carried in the communication data. After receiving the data packet in the communication process, the first terminal and the second terminal may read the pulse number threshold N from the data packet, and perform timing communication based on the pulse number threshold N in the data packet. Furthermore, the communication protocol adopted by the first terminal and the second terminal may further define that the pulse number threshold N and the tamper-proof check value are simultaneously carried in the communication data. After receiving the data packet in the communication process, the first terminal and the second terminal may read the pulse number threshold N and the tamper-proof check value in the data packet, in which the tamper-proof check value is a check value generated based on the pulse number threshold N. For example, the tamper-proof check value is obtained by performing a digest operation on the pulse number threshold N. After receiving the data packet in the communication process, the first terminal and the second terminal read the pulse number threshold N from the data packets to perform a verification operation. After receiving the data packet in the communication process, the first terminal and the second terminal read the pulse number threshold N that is tampered with by the third terminal from the data packet, which may cause the verification to fail. After the verification is successful, the first terminal and the second terminal perform timing communication based on the pulse number threshold N in the data packet. Alternatively, the pulse number threshold N and the tamper-proof check value may be added to the data header or data tail of the communication data packet defined by the existing communication protocol. Obviously, the present disclosure is not limited to this. By writing the pulse number threshold N to the transmission protocol to ensure that each packet contains the pulse number threshold N, and the first terminal and the second terminal do not need to store the pulse number threshold N, so as to prevent the third party from breaking the storage module of the first terminal or the second terminal to obtain the pulse number threshold N, and improve the communication efficiency.

The first terminal generates the pulse number threshold N based on ω, and N≥ω, in which ω is the number of pulses generated when the communication carrier signal goes through a predetermined completion time period of processing by the second terminal the received data from the first terminal.

The first terminal can obtain ω in a variety of ways, including but not being limited to the following: ω can be obtained by the first terminal from external key input, ω can be obtained when the second terminal sends it to the first terminal, ω can be obtained from scanning code by the first terminal, ω can be obtained from the factory preconfigured information by the first terminal; N≥ω ensures that the second terminal completes the processing of the data packet to be processed and generating the response data packet before the response data packet needs to be sent, thereby ensuring normal communication between the first terminal and the second terminal.

Alternatively, ω≤N≤λ, in which, λ is change value in the number of pulses generated when the communication carrier signal goes through a frame waiting time defined by a communication protocol adopted by the first terminal and the second terminal. A frame waiting time refers to the effective waiting time after the data packet to be processed is sent, which is defined in the communication protocol. Communication fails after frame waiting time. N≤λ ensures that the second terminal sends the response data packet to the first terminal within the frame waiting time, which is compatible with the existing communication protocol, and ensures normal communication between the first terminal and the second terminal under the existing communication protocol.

After the first terminal generates the pulse number threshold N, and the pulse number threshold N may be sent to the second terminal in the following manner.

The first terminal encrypts the pulse number threshold N by using the second terminal public key to generate a pulse number threshold ciphertext, and sends the pulse number threshold ciphertext to the second terminal. The pulse number threshold ciphertext generated by the encryption operation on the pulse number threshold through the second terminal public key can only be decrypted by the second terminal private key, and the second terminal private key is stored in the second terminal security chip and cannot be obtained by the external terminal, thereby ensuring the security of the pulse number threshold N. The second terminal receives the pulse number threshold ciphertext, and decrypts the pulse number threshold ciphertext by using the second terminal private key to obtain the pulse number threshold, and stores pulse number threshold, which realizes that the first terminal sends the generated threshold pulse number N to the second terminal and ensures the security of the process of sending the pulse number threshold N.

Or, the first terminal generates a first random number and sends the first random number and CA certificate of the first terminal to the second terminal.

The first random number may be generated by the first terminal according to an external random noise signal, or may be generated by the first terminal according to an internal random number generator, to ensure external unreachability of the first random number.

The second terminal receives the first random number and the CA certificate of the first terminal; generates a second random number; performs an authentication operation on the CA certificate of the first terminal; after the authentication succeeds, obtains the first terminal public key and performs a signature operation on the first random number by using the second terminal private key to generate the first signature information; encrypts the second random number by using the first terminal public key to generates the second random number ciphertext; and sends the first negotiation information to the first terminal, in which the first negotiation information includes at least: a CA certificate of the second terminal, the first signature information, and the second random number ciphertext.

The second random number may be generated by the second terminal according to an external random noise signal, or may be generated by the second terminal according to an internal random number generator, to ensure external unreachability of the second random number. The second terminal obtains the first terminal public key based on the CA certificate of the first terminal, and encrypts the second random number by using the first terminal public key. The second random number ciphertext generated by encryption through using the first terminal public key encryption can only be decrypted by using the first terminal private key, and the first terminal private key is stored in the first terminal security chip and cannot be obtained by the external terminal, thereby ensuring the security of the second random number.

The first terminal receives the first negotiation data packet, and performs an authentication operation on the CA certificate of the second terminal; after the authentication succeeds, performs a verification operation on the first signature information based on the second terminal public key; after the verification succeeds, encrypts the second random number ciphertext by using the first terminal private key to obtain the second random number; performs a signature operation on the second random number by using the first terminal private key to generate the second signature information; generates the third random number, encrypts the third random number by using the second terminal public key to obtain the third random number ciphertext; obtains the transmission key according to the first predetermined algorithm based on the second random number and the third random number, and sends the second negotiation information to the second terminal, in which the second negotiation information includes at least: the second signature information, and the third random number ciphertext.

The first terminal performs an identity authentication on the second terminal based on the second terminal public key to ensure the legality of the second terminal; after the authentication succeeds, encrypts the second random number ciphertext by using the first terminal private key to obtain the second random number; generates the third random number; obtains the transmission key according to the first predetermined algorithm based on the second random number and the third random number, in which the third random number may be generated by the first terminal according to an external random noise signal, or may be generated by the first terminal according to an internal random number generator, to ensure external unreachability of the second random number, encrypts the third random number by using the second terminal public key. The third random number ciphertext generated by encryption through using the second terminal public key can only be decrypted by using the second terminal private key, and the second terminal private key is stored in the second terminal security chip and cannot be obtained by the external terminal, thereby ensuring the security of the third random number.

The second terminal receives the second negotiation data packet, and performs a verification operation on the second signature information based on the first terminal public key; after the verification succeeds, decrypts the third random number ciphertext by using the second terminal private key to obtain the third random number; obtains the transmission key according to the first predetermined algorithm based on the second random number and the third random number. The second terminal generates the transmission key generation feedback information, and sends the transmission key generation feedback information to the first terminal.

The second terminal decrypts the third random number ciphertext by using the second terminal private key to obtain the third random number; obtains the transmission key according to the first predetermined algorithm based on the second random number and the third random number. The first terminal and the second terminal respectively obtain the transmission key according to the first predetermined algorithm based on the second random number and the third random number, which not only ensures that the two sides negotiate the same transmission key, but also does not need to send the transmission key, thereby avoiding the leakage of the transmission key during the communication process and improving the security of the communication.

The first terminal receives the transmission key generation feedback information, encrypts the generated pulse number threshold N by using the transmission key to generate the pulse number threshold ciphertext, and sends the pulse number threshold ciphertext to the second terminal.

The first terminal encrypts the pulse number threshold N by using the transmission key to generate the pulse number threshold ciphertext. The transmission key is respectively obtained by the first terminal and the second terminal based on the second random number and the third random number according to the first predetermined algorithm, and is only stored inside the first terminal and the second terminal, which cannot be obtained by the external terminal, thereby ensuring the security of the pulse number threshold N.

The second terminal receives the pulse number threshold ciphertext, and decrypts the pulse number threshold ciphertext by using the second terminal private key to obtain the pulse number threshold N, and stores the pulse number threshold N.

The second terminal decrypts the pulse number threshold ciphertext by using the transmission key to obtain the pulse number threshold N, and stores the pulse number threshold N, which realizes that the first terminal sends the generated threshold pulse number N to the second terminal and ensures the security of the process of sending the pulse number threshold N.

Alternatively, the pulse number threshold N is generated by the first terminal negotiating with the second terminal. The negotiating includes the following. The first terminal generates N and sends N to the second terminal, and the second terminal sends a response message to the first terminal after the second terminal successfully authenticates the first terminal. Or the second terminal generates N and sends N to the first terminal, and the first terminal sends a response message to the second terminal after the first terminal successfully authenticates the second terminal. Or the first terminal generates N1 and sends N1 to the second terminal, the second terminal generates N2 and sends N2 to the first terminal, and the first terminal and the second terminal respectively generate the N by using N1 and N2 based on the same algorithm.

The above negotiation process may include, but is not limited to, the following three implementation solutions provided by the embodiment.

Implementation 1:

The first terminal generates a first random number and sends the first random number to the second terminal.

The first random number may be generated by the first terminal according to an external random noise signal, or may be generated by the first terminal according to an internal random number generator, to ensure external unreachability of the first random number.

The second terminal receives the first random number, generates a second random number, performs a signature operation on the first random number by using the second terminal private key to generate first signature information, and sends the first negotiation data packet to the first terminal, in which the first negotiation data packet includes at least: a CA certificate of the second terminal, the first signature information, and the second random number.

The second random number may be generated by the second terminal according to an external random noise signal, or may be generated by the second terminal according to an internal random number generator, to ensure external unreachability of the second random number. The second terminal performs a signature operation on the first random number based on the private key thereof, and sends the CA certificate of the second terminal to the first terminal, so that the first terminal may authenticate the legality of the second terminal.

The first terminal receives the first negotiation data packet, and performs an authentication operation on the CA certificate of the second terminal, obtains the second terminal public key after the authentication succeeds, performs a verification operation on the first signature information based on the second terminal public key, performs a signature operation on the second random number by using the first terminal private key after the verification succeeds to generate the second signature information, and sends the second negotiation data packet to the second terminal, in which the second negotiation data packet includes at least: the CA certificate of the first terminal, and the second signature information.

The first terminal performs an identity authentication on the second terminal based on the second terminal public key to ensure the legality of the second terminal. After the authentication succeeds, the first terminal performs a signature operation on the second random number based on the private key, and sends the self-CA certificate to the second terminal, so that the second terminal authenticates the legality of the first terminal.

The second terminal receives the second negotiation data packet, and performs an authentication operation on the CA certificate of the first terminal, obtains the first terminal public key after the authentication succeeds, performs a verification operation on the second signature information based on the first terminal public key, generates the pulse number threshold N after the verification succeeds, encrypts the pulse number threshold N by using the first terminal public key to generates a pulse number threshold ciphertext, and sends the pulse number threshold ciphertext to the first terminal.

The second terminal performs an identity authentication on the first terminal based on the first terminal public key to ensure the legality of the first terminal. After the authentication succeeds, the second terminal generates the pulse number threshold N, encrypts the pulse number threshold N by using the first terminal public key to generate the pulse number threshold ciphertext. The pulse number threshold ciphertext generated by the encryption on the pulse number threshold by using the first terminal public key, can only be decrypted by using the first terminal private key, and the first terminal private key is stored in the first terminal security chip and cannot be obtained by the external terminal, thereby ensuring the security of the pulse number threshold N.

The first terminal receives the pulse number threshold ciphertext, and decrypts the pulse number threshold ciphertext by using the first terminal private key to obtain the pulse number threshold N and store the pulse number threshold N.

The first terminal decrypts the pulse number threshold ciphertext by using the first terminal private key to obtain the pulse number threshold N and store the pulse number threshold N, which realizes the negotiation of the pulse number threshold N between the first terminal and the second terminal, thereby ensuring the security of the negotiation process.

Implementation 2:

The first terminal generates a first random number and sends the first random number and a CA certificate of the first terminal to the second terminal.

The first random number may be generated by the first terminal according to an external random noise signal, or may be generated by the first terminal according to an internal random number generator, to ensure external unreachability of the first random number.

The second terminal receives the first random number and the CA certificate of the first terminal; generates a second random number, performs an authentication operation on the CA certificate of the first terminal; after the authentication succeeds, obtains the first terminal public key and performs a signature operation on the first random number by using the second terminal private key to generate the first signature information; encrypts the second random number by using the first terminal public key to generates the second random number ciphertext; and sends the first negotiation information to the first terminal, in which the first negotiation information includes at least: a CA certificate of the second terminal, the first signature information, and the second random number ciphertext.

The second random number may be generated by the second terminal according to an external random noise signal, or may be generated by the second terminal according to an internal random number generator, to ensure external unreachability of the second random number. The second terminal obtains the first terminal public key based on the CA certificate of the first terminal, and encrypts the second random number by using the first terminal public key. The second random number ciphertext generated by encryption through using the first terminal public key can only be decrypted by using the first terminal private key, and the first terminal private key is stored in the first terminal security chip and cannot be obtained by the external terminal, thereby ensuring the security of the second random number.

The first terminal receives the first negotiation data packet, and performs an authentication operation on the CA certificate of the second terminal; after the authentication succeeds, performs a verification operation on the first signature information based on the second terminal public key; after the verification succeeds, encrypts the second random number ciphertext by using the first terminal private key to obtain the second random number; performs a signature operation on the second random number by using the first terminal private key to generate the second signature information; generates the third random number, encrypts the third random number by using the second terminal public key to obtain the third random number ciphertext; obtains the transmission key according to the first predetermined algorithm based on the second random number and the third random number, and sends the second negotiation information to the second terminal, in which the second negotiation information includes at least: the second signature information, and the third random number ciphertext.

The first terminal performs an identity authentication on the second terminal based on the second terminal public key to ensure the legality of the second terminal; after the authentication succeeds, encrypts the second random number ciphertext by using the first terminal private key to obtain the second random number; generates the third random number; obtains the transmission key according to the first predetermined algorithm based on the second random number and the third random number, in which the third random number may be generated by the first terminal according to an external random noise signal, or may be generated by the first terminal according to an internal random number generator, to ensure external unreachability of the second random number; encrypts the third random number by using the second terminal public key. The third random number ciphertext generated by encryption through using the second terminal public key can only be decrypted by using the second terminal private key, and the second terminal private key is stored in the second terminal security chip and cannot be obtained by the external terminal, thereby ensuring the security of the third random number.

The second terminal receives the second negotiation data packet, and performs a verification operation on the second signature information based on the first terminal public key; after the verification succeeds, decrypts the third random number ciphertext by using the second terminal private key to obtain the third random number; obtains the transmission key according to the first predetermined algorithm based on the second random number and the third random number. The second terminal generates the transmission key generation feedback information, and sends the transmission key generation feedback information to the first terminal.

The second terminal decrypts the third random number ciphertext by using the second terminal private key to obtain the third random number obtains the transmission key according to the first predetermined algorithm based on the second random number and the third random number. The first terminal and the second terminal respectively obtain the transmission key according to the first predetermined algorithm based on the second random number and the third random number, which not only ensures that the two sides negotiate the same transmission key, but also does not need to send the transmission key, thereby avoiding the leakage of the transmission key during the communication process and improving the security of the communication.

The first terminal receives the transmission key generation feedback information, generates the pulse number threshold N, encrypts the pulse number threshold N by using the transmission key to generate the pulse number threshold ciphertext, and sends the pulse number threshold ciphertext to the second terminal.

The first terminal generates the pulse number threshold N, and encrypts the pulse number threshold N by using the transmission key to generate the pulse number threshold ciphertext. The transmission key is respectively obtained by the first terminal and the second terminal based on the second random number and the third random number according to the first predetermined algorithm, and is only stored inside the first terminal and the second terminal, which cannot be obtained by the external terminal, thereby ensuring the security of the pulse number threshold N.

The second terminal receives the pulse number threshold ciphertext, and decrypts the pulse number threshold ciphertext by using the second terminal private key to obtain the pulse number threshold N, and stores the pulse number threshold N.

The second terminal decrypts the pulse number threshold ciphertext by using the transmission key to obtain the pulse number threshold N, and stores the pulse number threshold N, which realizes the negotiation of the pulse number threshold N between the first terminal and the second terminal, thereby ensuring the security of the negotiation process.

Implementation 3:

The first terminal generates a first random number and sends the first random number and a CA certificate of the first terminal to the second terminal.

The first random number may be generated by the first terminal according to an external random noise signal, or may be generated by the first terminal according to an internal random number generator, to ensure external unreachability of the first random number.

The second terminal receives the first random number and the CA certificate of the first terminal; generates N2; performs an authentication operation on the CA certificate of the first terminal; after the authentication succeeds, obtains the first terminal public key after the authentication succeeds and performs a signature operation on the first random number by using the second terminal private key to generate the first signature information; encrypts N2 by using the first terminal public key to generate a N2 ciphertext; and sends the first negotiation information to the first terminal, in which the first negotiation information includes at least: a CA certificate of the second terminal, the first signature information, and the N2 ciphertext.

N2 may be generated by the second terminal according to an external random noise signal, or may be generated by the second terminal according to an internal random number generator, to ensure external unreachability of N2. The second terminal obtains the first terminal public key based on the CA certificate of the first terminal, and encrypts N2 by using the first terminal public key. The N2 ciphertext generated by encryption through using the first terminal public key can only be decrypted by using the first terminal private key, and the first terminal private key is stored in the first terminal security chip and cannot be obtained by the external terminal, thereby ensuring the security of N2.

The first terminal receives the first negotiation data packet, and performs an authentication operation on the CA certificate of the second terminal; after the authentication succeeds, performs a verification operation on the first signature information based on the second terminal public key; after the verification succeeds, encrypts the N2 ciphertext by using the first terminal private key to obtain N2; performs a signature operation on N2 by using the first terminal private key to generate the second signature information; generates N1; encrypts N1 by using the second terminal public key to obtain a N1 ciphertext; obtains the transmission key according to the second predetermined algorithm based on N2 and N1; and sends the second negotiation information to the second terminal, in which the second negotiation information includes at least: the second signature information, and the N1 ciphertext.

The first terminal performs an identity authentication on the second terminal based on the second terminal public key to ensure the legality of the second terminal; after the authentication succeeds, encrypts the N2 ciphertext by using the first terminal private key to obtain N2 generates N1; obtains the pulse number threshold N according to the second predetermined algorithm based on N1 and N2. N may be generated by the first terminal according to an external random noise signal, or may be generated by the first terminal according to an internal random number generator, to ensure external unreachability of the second random number. N1 is encrypted by using the second terminal public key, and the N1 ciphertext generated by using the second terminal public key can only be decrypted by using the second terminal private key. The second terminal private key is stored in the second terminal security chip and cannot be obtained by the external terminal, thereby ensuring the security of N1.

The second terminal receives the second negotiation data packet, and performs a verification operation on the second signature information based on the first terminal public key; after the verification succeeds, decrypts the N1 ciphertext by using the second terminal private key to obtain N1; obtains the pulse number threshold N according to the second predetermined algorithm based on N1 and N2.

The second terminal decrypts the N1 ciphertext by using the second terminal private key to obtain N1, and obtains the pulse number threshold N according to the second predetermined algorithm based on N1 and N2. The first terminal and the second terminal respectively obtain the pulse number threshold N according to the second predetermined algorithm based on N1 and N2, which not only ensures that the two sides negotiate the same the pulse number threshold N, but also does not need to send out the pulse number threshold N, thereby avoiding the leakage of the transmission key during the communication process and improving the security of the communication.

Through the negotiation process of the pulse number threshold N, the security of the pulse number threshold N can be ensured, and the pulse number threshold N is prevented from being externally tampered. Furthermore, the negotiation process of the pulse number threshold N can be negotiated before each information interaction, thereby further ensuring the security of the number threshold pulses N.

Alternatively, the communication manner adopted by the first terminal and the second terminal includes short distance wireless communication, which includes the following communication protocols: Bluetooth communication protocol, IrDA communication protocol, RFID communication protocol, ZigBee communication protocol, Ultra WideBand communication protocol, near field communication (NFC) communication protocol, WiMedia communication protocol, GPS communication protocol, DECT communication protocol, 1394 wireless communication protocol and dedicated wireless communication protocol. Obviously, the following communication protocols that may occur in the future are equivalent to the above communication protocols: the time required for data transmission under the maximum transmission distance supported by the communication protocol is less than the time required for data to be tampered with by external devices.

It can be seen from the above technical solutions provided in the present disclosure that, with the data communication method provided in the present disclosure, the first terminal begins to record the first number of pulses corresponding to the communication carrier signal sent by the first terminal when the first terminal completes sending the data packet to be processed, and receives the response data packet when the first number of pulses reaches the pulse number threshold N; the second terminal begins to record the second number of pulses corresponding to the communication carrier signal received by the second terminal when the second terminal completes receiving the data packet to be processed, and sends the response data packet to the first terminal when the second number of pulses reaches the pulse number threshold N. Therefore, simultaneous receiving and sending through detecting the numbers of pulses by the first terminal and by the second terminal greatly improves the timing accuracy of the two parties, thus ensuring that the first terminal and the second terminal receive and send response data packets only at a particular moment of high precision. That is, even if the response data packet sent by the second terminal to the first terminal is intercepted by a third party during the transmission, the first terminal has already terminated the communication process when the data tampered by the third party reaches the first terminal, this is because the third party tampers with the data at millisecond level, which is far greater than the timing accuracy of the first terminal, and the first terminal immediately stops the communication if not receiving the response data packet at the particular moment, thereby greatly improving the reliability of the received response data packet. $N \geq \omega$ ensures that the second terminal completes processing of the data packet to be processed and generating the response data packet before the response data packet needs to be sent. $N \leq \lambda$ ensures that the communication method and system is compatible with the existing communication protocol.

Figure 3:
FIG. 3 is a block diagram of a data communication system according to embodiment 1 of the present disclosure.

As illustrated in FIG. 3, the embodiment provides a data communication system for performing the secure communication method in the method embodiment illustrated in FIG. 1 or 2. The system includes: a first terminal and a second terminal.

The first terminal continuously generates a communication carrier signal during communication with the second terminal. The first terminal is configured to send a communication data signal carrying a data packet to be processed, and begin to record the first number of pulses corresponding to the communication carrier signal sent by the first terminal when the first terminal completes sending the data packet to be processed; in which the communication data signal is obtained by the first terminal through modulating the data packet to be processed onto the communication carrier signal; the second terminal is configured to receive the communication data signal carrying the data packet to be processed, begin to record the second number of pulses corresponding to the communication carrier signal received by the second terminal when the second terminal completes receiving the data packet to be processed, and generate a response data packet based on the data packet to be processed; the second terminal is configured to send the response data packet to the first terminal when the recorded second number of pulses reaches a pulse number threshold N; and the first terminal is configured to allow to begin receiving the response data packet when the recorded first number of pulses reaches the pulse number threshold N.

Alternatively, the first terminal is configured to generate a communication request, and send the communication request to the second terminal. The second terminal is configured to receive the communication request, generate a first negotiation data packet based on the communication request, and send the first negotiation data packet to the first terminal. The first terminal is configured to receive the first negotiation data packet, perform an authentication operation on the second terminal based on the first negotiation data packet, and after the authentication succeeds, generate a second negotiation data packet, and send the second negotiation data packet to the second terminal. The second terminal is configured to receive the second negotiation data packet, perform an authentication operation on the first terminal based on the second negotiation data packet, and ater the authentication succeeds, generate the pulse number threshold N, encrypt the pulse number threshold N to generate a pulse number threshold ciphertext, and send the pulse number threshold ciphertext to the first terminal, in which $N \leq \lambda$, and $\lambda$ is the number of pulses generated when the communication carrier signal goes through a frame waiting time defined by a communication protocol adopted by the first terminal and the second terminal. The first terminal is configured to receive the pulse number threshold ciphertext, decrypt the pulse number threshold ciphertext to obtain the pulse number threshold N, and store the pulse number threshold N.

Alternatively, the pulse number threshold N is stored in factory preconfigured information of the first terminal and of the second terminal, in which $N \leq \lambda$, and $\lambda$ is the number of pulses generated when the communication carrier signal goes through a frame waiting time defined by a communication protocol adopted by the first terminal and the second terminal.

Alternatively, the first terminal and the second terminal perform data interaction based on a pulse communication protocol, and perform a verification operation on the received pulse number threshold N based on a tamper-proof check value, in which the pulse communication protocol is a communication protocol in which transmission data at least includes the pulse number threshold N and the tamper-proof check value. The pulse number threshold N is generated by the first terminal based on $\omega$, and $N \geq \omega$, in which $\omega$ is the number of pulses generated when the communication carrier signal goes through a predetermined completion time period of processing by the second terminal the received data from the first terminal. Or, the pulse number threshold N is generated by the first terminal negotiating with the second terminal, in which the negotiating including: the first terminal generating N and sending N to the second terminal, the second terminal sending a response message to the first terminal after the second terminal successfully authenticates the first terminal; or the second terminal generating N and sending N to the first terminal, the first terminal sending a response message to the second terminal after the first terminal successfully authenticates the second terminal; or the first terminal generating N1 and sending N1 to the second terminal, the second terminal generating N2 and sending N2 to the first terminal, the first terminal and the second terminal respectively generating the N by using N1 and N2 based on the same algorithm.

Alternatively, a communication manner adopted by the first terminal and the second terminal comprises: a short distance wireless communication manner.

It can be seen from the above technical solutions provided in the present disclosure that, with the data communication method and system provided in the present disclosure, the first terminal begins to record the first number of pulses corresponding to the communication carrier signal sent by the first terminal when the first terminal completes sending the data packet to be processed, and receives the response data packet when the first number of pulses reaches the pulse number threshold N; the second terminal begins to record the second number of pulses corresponding to the communication carrier signal received by the second terminal when the second terminal completes receiving the data packet to be processed, and sends the response data packet to the first terminal when the second number of pulses reaches the pulse number threshold N. Therefore, simultaneous receiving and sending through detecting the numbers of pulses by the first terminal and by the second terminal greatly improves the timing accuracy of the two parties, thus ensuring that the first terminal and the second terminal receive and send response data packets only at a particular moment of high precision. That is, even if the response data packet sent by the second terminal to the first terminal is intercepted by a third party during the transmission, the first terminal has already terminated the communication process when the data tampered by the third party reaches the first terminal, this is because the third party tampers with the data at millisecond level, which is far greater than the timing accuracy of the first terminal, and the first terminal immediately stops the communication if not receiving the response data packet at the particular moment, thereby greatly improving the reliability of the received response data packet. N≥ω ensures that the second terminal completes the processing of the data packet to be processed and generating the response data packet before the response data packet needs to be sent. N≤λ ensures that the communication method and system is compatible with the existing communication protocol.

Embodiment 2

Figure 4:
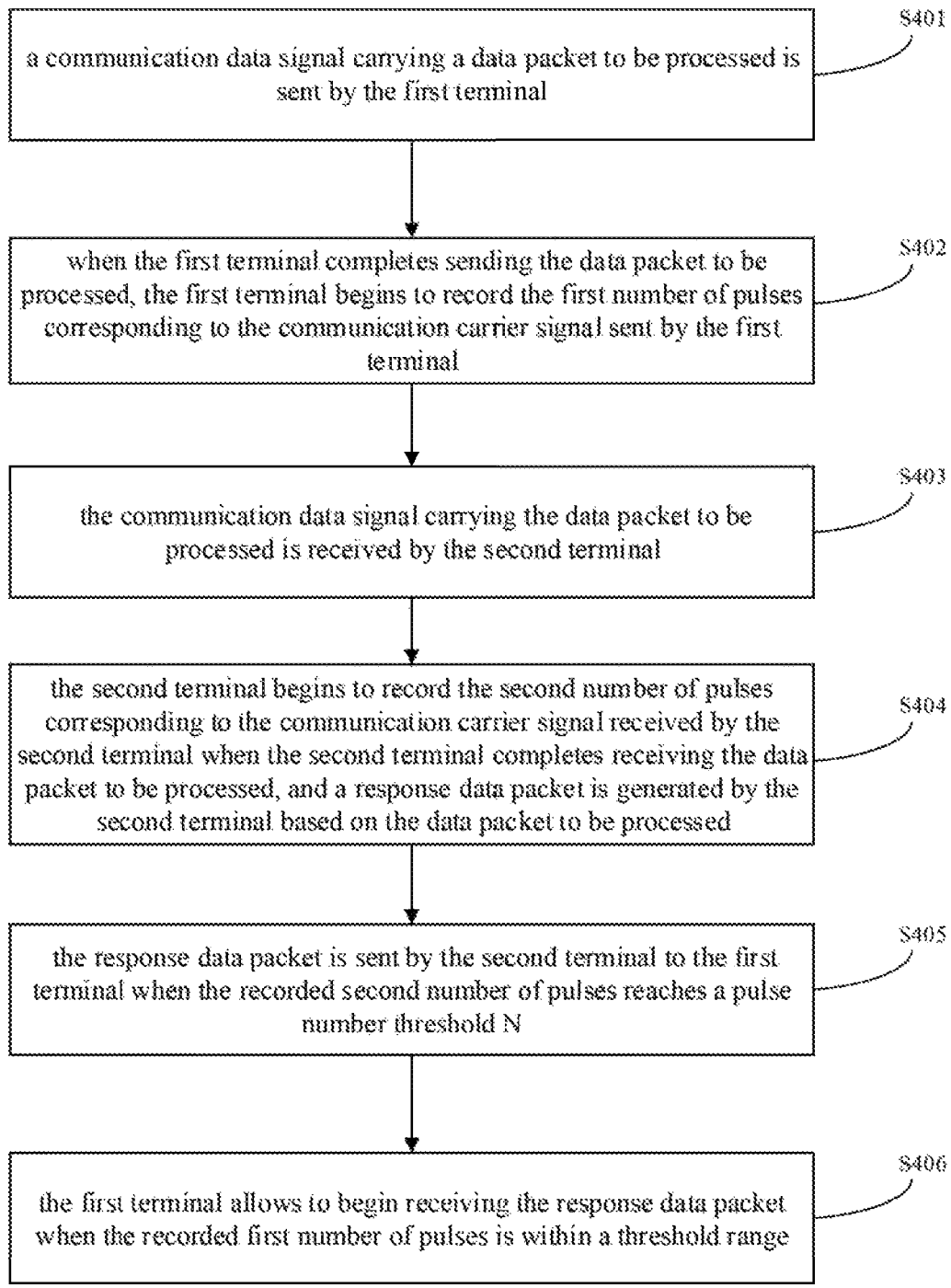
FIG. 4 is a flow chart of a data communication method according to embodiment 2 of the present disclosure.

This embodiment provides a data communication method, as illustrated in FIG. 4, including actions in the following blocks.

At block S401, a communication data signal carrying a data packet to be processed is sent by the first terminal.

At block S402, when the first terminal completes sending the data packet to be processed, the first terminal begins to record the first number of pulses corresponding to the communication carrier signal sent by the first terminal; the communication data signal is obtained by the first terminal through modulating the data packet to be processed onto the communication carrier signal.

At block S403, the communication data signal carrying the data packet to be processed is received by the second terminal.

At block S404, the second terminal begins to record the second number of pulses corresponding to the communication carrier signal received by the second terminal when the second terminal completes receiving the data packet to be processed, and a response data packet is generated by the second terminal based on the data packet to be processed.

At block S405, the response data packet is sent by the second terminal to the first terminal when the recorded second number of pulses reaches a pulse number threshold N.

The actions in the above blocks S401 to S405 can also be referred to the related descriptions in blocks S101 to S105 in Embodiment 1.

At block S406, the first terminal allows to begin receiving the response data packet when the recorded first number of pulses is within a threshold range.

In the actual communication process, the first terminal and the second terminal have various communication times such as data transmission time, data reception time, data analysis and processing time, and data error correction time. It is not possible for the first terminal to immediately receive the response data packet after detecting that the first number of pulses reaches N. In fact, in the normal communication state, when the first terminal receives the response data packet that is sent by the second terminal when the second number of pulses reaches the pulse number threshold N, the first number of pulses detected by the first terminal is N+i, in which i is a change value in the number of pulses generated after the communication carrier signal passes various communication times such as data transmission time, data reception time, data analysis and processing time, and data error correction time. It is not possible for the first terminal to immediately receive the response data packet after detecting that the first number of pulses reaches N. Instead, the first terminal receives the response data packet within a short time range after detecting that the first number of pulses reaches N. Based on the pulse number threshold N, a threshold range can be obtained according to the error algorithm, within which only the maximum communication time such as the maximum data transmission time, the maximum data reception time, the maximum data analysis and processing time, and the maximum data error correction time between the first terminal and the second terminal can be realized. In the normal communication state, the actual value of the maximum communication time such as the maximum data transmission time, the maximum data reception time, the maximum data analysis and processing time, and the maximum data error correction time between the first terminal and the second terminal are minimum values. Therefore, the threshold range obtained according to the error algorithm is a small pulse range of values, for example as follows.

The first terminal rejects receiving data before detecting that the first number of pulses reaches N. The first terminal allows to begin receiving the response data package when detecting that the first number of pulses reaches N. The first terminal begins to reject receiving data when detecting that the first number of pulses reaches N+2θ. There is a certain communication distance S between the first terminal and the second terminal. After the communication carrier signal passes the communication distance S, a pulse change value ε with certain amount is generated. It is not possible for the first terminal to immediately receive the response data packet after detecting that the first number of pulses reaches N. In fact, when the first terminal receives the response data packet sent by the second terminal when the second terminal detects that the second number of pulses reaches N, the first number of pulses detected by the first terminal is N+2ε. The actual communication distance S between the first terminal and the second terminal is necessarily smaller than the maximum communication distance supported by the communication mode adopted by the first terminal and the second terminal. Alternatively, the communication mode adopted by the first terminal and the second terminal includes: short distance wireless communication mode, and n is a change value in the number of pulses generated when the communication carrier signal passes through the maximum communication distance supported by the communication mode adopted by the first terminal and the second terminal, and then ε is necessarily smaller than n. That is, in the normal communication state, when the first terminal detects that the first number of pulses is in the range of [N, N+2n], it is inevitable for the first terminal to receive the response data package. Once the rust number of pulses detected by the first terminal exceeds N+2n and the response data packet is not received, it is considered that the response data packet transmission is abnormal, and the response data packet is rejected, thereby ensuring communication security. Alternatively, N+2n is less than or equal to λ, and λ is the number of pulses generated when the communication carrier signal goes through a frame waiting time defined by the communication protocol adopted by the first terminal and the second terminal. N+2n is less than or equal to λ which ensures that the first terminal sends the response data packet to the second terminal within the frame waiting time, and is compatible with the existing communication protocol, and ensures normal communication between the first terminal and the second terminal under the existing communication protocol. When N+2n is less than or equal to λ, N is also necessarily less than λ, which ensures that the second terminal sends the response data packet to the first terminal within the frame waiting time, and is compatible with the existing communication protocol, and ensures normal communication between the first terminal and the second terminal under the existing communication protocol.

For example, when the distance between the first terminal and the second terminal is less than 10 cm, the data signal is transmitted at the speed of light and the time required for transmission at this time is negligible. That is, when the first terminal receives the response data packet that is sent by the second terminal when the second number of pulses reaches the pulse number threshold N, the first number of pulses detected by the first terminal is also N. At this time, since N is in the range of [N, N+2n], the first terminal allows to begin receiving data until the reception is completed, and the received data is processed. According to the embodiment 2, when the distance between the first terminal and the second terminal is minimum, it is possible to ensure the normal communication; when the distance between the first terminal and the second terminal is the maximum communication distance supported by the communication manner, such as the maximum communication distance supported by Bluetooth 2.0 is 10 meters, the maximum communication distance supported by ZigBee is 400 meters, the change value in the pulse number generated by the communication carrier signal passing through the space area between the first terminal and the second terminal is n. That is, when the first terminal receives the response data packet sent by the second terminal when the second terminal detects that the second number of pulses reaches N, the first number of pulses detected by the first terminal is N+2n. At this time, N+2n is in the range of [N, N+2n], the first terminal allows to begin receiving data until the reception is completed, and the received data is processed. According to the embodiment 2, when the distance between the first terminal and the second terminal is maximum, it is possible to ensure the normal communication. When the distance between the first terminal and the second terminal is the maximum communication distance supported by the communication manner, the change value in the pulse number N generated by the communication carrier signal passing through the space area between the first terminal and the second terminal is e, and a is less than n. When the first terminal receives the response data packet sent by the second terminal when the second terminal detects that the second number of pulses reaches N, the first number of pulses detected by the first terminal is N+2ε. At this time, since N+2ε is in the range of [N, N+2n], the first terminal allows to begin receiving data until the reception is completed, and the received data is processed. According to the embodiment 2, when the distance between the first terminal and the second terminal is maximum, it is possible to ensure the normal communication. In addition to the above, the first terminal is not allowed to receive externally transmitted data information. That is, the first terminal only allows to begin receiving the response data packet when the detected number of first terminal pulses is in the range of [N+2n], which greatly improves the reliability of the received response data packet. In this embodiment, the first terminal and the second terminal may be any device capable of data interaction communication. Alternatively, the first terminal may be a reader, including a card reader, a computer, a mobile phone, a router, an in-vehicle device, a server, etc. The second terminal may be a transponder, including a smart card, an ID card, a smart key device, a computer, a router, a smart home, a wearable device, etc. In the process of data communication, simultaneous receiving and sending through detecting the number of terminal pulses by the first terminal and detecting the number of terminal pulses by the second terminal greatly improves the timing accuracy of the two parties, thus ensuring that the first terminal and the second terminal receive and send response data packets only at a particular moment of high precision. That is, even if the response data packet sent by the second terminal to the first terminal is intercepted by a third party during the transmission, the first terminal has already terminated the communication process when the data tampered by the third party reaches the first terminal, this is because the third party tampers with the data at millisecond level, which is far greater than the timing accuracy of the first terminal, and the first terminal immediately stops the communication if not receiving the response data packet at the particular moment.

Alternatively, at block S401, before sending the communication data signal carrying the data packet to be processed, the method further includes the actions of negotiating the pulse number threshold, which specified refers to the detailed description of the method illustrated in FIG. 2 in the above Embodiment 1.

The embodiment provides a data communication system for performing the secure communication method in the method embodiment illustrated in FIG. 4. The system includes: a first terminal and a second terminal.

The first terminal continuously generating a communication carrier signal during communication with the second terminal. The first terminal is configured to send a communication data signal carrying a data packet to be processed, and begin to record the first number of pulses corresponding to the communication carrier signal sent by the first terminal when the first terminal completes sending the data packet to be processed; in which the communication data signal is obtained by the first terminal through modulating the data packet to be processed onto the communication carrier signal; the second terminal is configured to receive the communication data signal carrying the data packet to be processed, begin to record the second number of pulses corresponding to the communication carrier signal received by the second terminal when the second terminal completes receiving the data packet to be processed, and generate a response data packet based on the data packet to be processed; the second terminal is configured to send the response data packet to the first terminal when detecting that the second number of pulses reaches a pulse number threshold N; the first terminal is configured to allow to begin receiving the response data packet when detecting that the first number of pulses is within a threshold range, wherein the threshold range is obtained by the first terminal based on the pulse number threshold N.

Alternatively, the first terminal is configured to generate a communication request, and send the communication request to the second terminal. The second terminal is configured to receive the communication request, generate a first negotiation data packet based on the communication request, and send the first negotiation data packet to the first terminal. The first terminal is configured to receive the first negotiation data packet, perform an authentication operation on the second terminal based on the first negotiation data packet, and after the authentication succeeds, generate a second negotiation data packet, and send the second negotiation data packet to the second terminal. The second terminal is configured to receive the second negotiation data packet, perform an authentication operation on the first terminal based on the second negotiation data packet, and after the authentication succeeds, generate the pulse number threshold N, encrypt the pulse number threshold N to generate a pulse number threshold ciphertext, and send the pulse number threshold ciphertext to the first terminal, in which N≤λ, and λ is the number of pulses generated when the communication carrier signal goes through a frame waiting time defined by a communication protocol adopted by the first terminal and the second terminal. The first terminal is configured to receive the pulse number threshold ciphertext, decrypt the pulse number threshold ciphertext to obtain the pulse number threshold N, and store the pulse number threshold N.

Alternatively, the pulse number threshold N is stored in factory preconfigured information of the first terminal and of the second terminal, in which N≤λ, and λ is the number of pulses generated when the communication carrier signal goes through a frame waiting time defined by a communication protocol adopted by the first terminal and the second terminal.

Alternatively, the first terminal and the second terminal perform data interaction based on a pulse communication protocol, and perform a verification operation on the received pulse number threshold N based on a tamper-proof check value. The pulse communication protocol is a communication protocol in which transmission data at least comprises the pulse number threshold N; or the pulse communication protocol is a communication protocol in which transmission data at least comprises the pulse number threshold N and the tamper-proof check value. The tamper-proof check value is configured to perform the verification operation on the pulse number threshold N. The pulse number threshold N is generated by the first terminal based on ω, and N≥ω, in which ω is the number of pulses generated when the communication carrier signal goes through a predetermined completion time period of processing by the second terminal the received data from the first terminal. Or, the pulse number threshold N is generated by the first terminal negotiating with the second terminal, in which the negotiating includes: the first terminal generating N and sending N to the second terminal, the second terminal sending a response message to the first terminal after the second terminal successfully authenticates the first terminal; or the second terminal generating N and sending N to the first terminal, the first terminal sending a response message to the second terminal after the first terminal successfully authenticates the second terminal; or the first terminal generating N1 and sending N1 to the second terminal, the second terminal generating N2 and sending N2 to the first terminal, the first terminal and the second terminal respectively generating the N by using N1 and N2 based on the same algorithm.

Alternatively, a communication manner adopted by the first terminal and the second terminal comprises: a short distance wireless communication manner.

Alternatively, the threshold range is [N, N+2n], in which N+2n≤λ, and λ is the number of pulses generated when the communication carrier signal goes through a frame waiting time defined by a communication protocol adopted by the first terminal and the second terminal, and n is the number of pulses generated when the communication carrier signal goes through a maximum communication distance defined by a communication manner adopted by the first terminal and the second terminal.

It can be seen from the above technical solutions provided in the present disclosure that, with the data communication method and system provided in the present disclosure, the first terminal begins to record the first number of pulses corresponding to the communication carrier signal sent by the first terminal when the first terminal completes sending the data packet to be processed, and receives the response data packet when the first number of pulses is within the threshold range; the second terminal begins to record the second number of pulses corresponding to the communication carrier signal received by the second terminal when the second terminal completes receiving the data packet to be processed, and sends the response data packet to the first terminal when the second number of pulses reaches the pulse number threshold N. Therefore, simultaneous receiving and sending through detecting the numbers of pulses by the first terminal and by the second terminal greatly improves the timing accuracy of the two parties, thus ensuring that the first terminal and the second terminal receive and send response data packets only at a particular moment of high precision. That is, even if the response data packet sent by the second terminal to the first terminal is intercepted by a third party during the transmission, the first terminal has already terminated the communication process when the data tampered by the third party reaches the first terminal, this is because the third party tampers with the data at millisecond level, which is far greater than the timing accuracy of the first terminal, and the first terminal immediately stops the communication if not receiving the response data packet at the particular moment, thereby greatly improving the reliability of the received response data packet. Moreover, N≥λ ensures that the second terminal completes the processing of the data packet to be processed and generating the response data packet before the response data packet needs to be sent. N≤λ ensures that the communication method and system is compatible with the existing communication protocol.

In this embodiment, only the parts that are different from the embodiment 1 are described in detail, and the rest of the similar parts will not be described again. For details, refer to the related description in the embodiment 1.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment" "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A data communication method, wherein, a first terminal continuously generates a communication carrier signal during communication with a second terminal, the method comprising:
    sending by the first terminal a communication data signal carrying a data packet to be processed, beginning by the first terminal to record a first number of pulses corresponding to the communication carrier signal sent by the first terminal when the first terminal completes sending the data packet to be processed; wherein the communication data signal is obtained by the first terminal through modulating the data packet to be processed onto the communication carrier signal;
    receiving by the second terminal the communication data signal carrying the data packet to be processed, beginning by the second terminal to record a second number of pulses corresponding to the communication carrier signal received by the second terminal when the second terminal completes receiving the data packet to be processed, generating by the second terminal a response data packet based on the data packet to be processed;
    sending, by the second terminal, the response data packet to the first terminal when the recorded second number of pulses reaches a pulse number threshold N; and
    allowing, by the first terminal, to begin receiving the response data packet when the recorded first number of pulses reaches the pulse number threshold N.

2. The method according to claim 1, wherein, before sending by the first terminal the communication data signal carrying the data packet to be processed, the method further comprises:
    generating by the first terminal a communication request, and sending by the first terminal the communication request to the second terminal;
    receiving by the second terminal the communication request, generating by the second terminal a first negotiation data packet based on the communication request, and sending by the second terminal the first negotiation data packet to the first terminal;
    receiving by the first terminal the first negotiation data packet, performing by the first terminal an authentication operation on the second terminal based on the first negotiation data packet, and after the authentication succeeds, generating by the first terminal a second negotiation data packet, and sending by the first terminal the second negotiation data packet to the second terminal;
    receiving by the second terminal the second negotiation data packet, performing by the second terminal an authentication operation on the first terminal based on the second negotiation data packet, and after the authentication succeeds, generating by the second terminal the pulse number threshold N, encrypting by the second terminal the pulse number threshold N to generate a pulse number threshold ciphertext, and sending by the second terminal the pulse number threshold ciphertext to the first terminal, wherein $N \leq \lambda$, and $\lambda$ is the number of pulses generated when the communication carrier signal goes through a frame waiting time defined by a communication protocol adopted by the first terminal and the second terminal;
    receiving by the first terminal the pulse number threshold ciphertext, decrypting by the first terminal the pulse number threshold ciphertext to obtain the pulse number threshold N, and storing by the first terminal the pulse number threshold N.

3. The method according to claim 1, wherein, the pulse number threshold N is stored in factory preconfigured information of the first terminal and of the second terminal, wherein $N \leq \lambda$, and $\lambda$ is the number of pulses generated when the communication carrier signal goes through a frame waiting time defined by a communication protocol adopted by the first terminal and the second terminal.

4. The method according to claim 1, wherein, the first terminal and the second terminal perform data interaction based on a pulse communication protocol, and perform a verification operation on the received pulse number threshold N based on a tamper-proof check value, wherein the pulse communication protocol is a communication protocol in which transmission data at least comprises the pulse number threshold N and the tamper-proof check value;
    the pulse number threshold N is generated by the first terminal based on $\omega$, and $N \geq \omega$, in which $\omega$ is the number of pulses generated when the communication carrier signal goes through a predetermined completion time period of processing by the second terminal the received data from the first terminal, or
    the pulse number threshold N is generated by the first terminal negotiating with the second terminal, in which the negotiating comprises: the first terminal generating N and sending N to the second terminal, the second terminal sending a response message to the first terminal after the second terminal successfully authenticates the first terminal; or the second terminal generating N and sending N to the first terminal, the first terminal sending a response message to the second terminal after the first terminal successfully authenticates the second terminal; or the first terminal generating N1 and sending N1 to the second terminal, the second terminal generating N2 and sending N2 to the first terminal, the first terminal and the second terminal respectively generating the N by using N1 and N2 based on the same algorithm.

5. The method according to claim 1, wherein, a communication manner adopted by the first terminal and the second terminal comprises: a short distance wireless communication manner;
the first terminal is a reader, and the second terminal is a transponder.

6. A data communication system, comprising a first terminal and a second terminal,
wherein the first terminal is configured to continuously generate a communication carrier signal during communication with the second terminal,
the first terminal is configured to send a communication data signal carrying a data packet to be processed, begin to record a first number of pulses corresponding to the communication carrier signal sent by the first terminal when the first terminal completes sending the data packet to be processed; wherein the communication data signal is obtained by the first terminal through modulating the data packet to be processed onto the communication carrier signal;
the second terminal is configured to receive the communication data signal carrying the data packet to be processed, begin to record a second number of pulses corresponding to the communication carrier signal received by the second terminal when the second terminal completes receiving the data packet to be processed, and generate a response data packet based on the data packet to be processed, and send the response data packet to the first terminal when the recorded second number of pulses reaches a pulse number threshold N; and
the first terminal is configured to allow to begin receiving the response data packet when the recorded first number of pulses reaches the pulse number threshold N.

7. The system according to claim 6, wherein
the first terminal is further configured to, before sending the communication data signal carrying the data packet to be processed, generate a communication request, and send the communication request to the second terminal;
the second terminal is further configured to, receive the communication request, generate a first negotiation data packet based on the communication request, and send the first negotiation data packet to the first terminal;
the first terminal is further configured to, receive the first negotiation data packet, perform an authentication operation on the second terminal based on the first negotiation data packet, and after the authentication succeeds, generate a second negotiation data packet, and send the second negotiation data packet to the second terminal;
the second terminal is further configured to, receive the second negotiation data packet, perform an authentication operation on the first terminal based on the second negotiation data packet, and after the authentication succeeds, generate the pulse number threshold N, encrypt the pulse number threshold N to generate a pulse number threshold ciphertext, and send the pulse number threshold ciphertext to the first terminal, wherein N≤λ, and λ is the number of pulses generated when the communication carrier signal goes through a frame waiting time defined by a communication protocol adopted by the first terminal and the second terminal;
the first terminal is further configured to, receive the pulse number threshold ciphertext, decrypt the pulse number threshold ciphertext to obtain the pulse number threshold N, and store the pulse number threshold N.

8. The system according to claim 6, wherein, the pulse number threshold N is stored in factory preconfigured information of the first terminal and of the second terminal, wherein N≤λ, and λ is the number of pulses generated when the communication carrier signal goes through a frame waiting time defined by a communication protocol adopted by the first terminal and the second terminal.

9. The system according to claim 6, wherein, the first terminal and the second terminal perform data interaction based on a pulse communication protocol, and perform a verification operation on the received pulse number threshold N based on a tamper-proof check value, wherein the pulse communication protocol is a communication protocol in which transmission data at least comprises the pulse number threshold N and the tamper-proof check value;
the pulse number threshold N is generated by the first terminal based on ω, and N≥ω, in which ω is the number of pulses generated when the communication carrier signal goes through a predetermined completion time period of processing by the second terminal the received data from the first terminal, or
the pulse number threshold N is generated by the first terminal negotiating with the second terminal, in which the negotiating comprises: the first terminal generating N and sending N to the second terminal, the second terminal sending a response message to the first terminal after the second terminal successfully authenticates the first terminal; or the second terminal generating N and sending N to the first terminal, the first terminal sending a response message to the second terminal after the first terminal successfully authenticates the second terminal; or the first terminal generating N1 and sending N1 to the second terminal, the second terminal generating N2 and sending N2 to the first terminal, the first terminal and the second terminal respectively generating the N by using N1 and N2 based on the same algorithm.

10. The system according to claim 6, wherein, a communication manner adopted by the first terminal and the second terminal comprises: a short distance wireless communication manner;
the first terminal is a reader, and the second terminal is a transponder.

11. A data communication method, wherein, a first terminal continuously generates a communication carrier signal during communication with a second terminal, the method comprising:
sending by the first terminal a communication data signal carrying a data packet to be processed, beginning by the first terminal to record a first number of pulses corresponding to the communication carrier signal sent by the first terminal when the first terminal completes sending the data packet to be processed; wherein the communication data signal is obtained by the first terminal through modulating the data packet to be processed onto the communication carrier signal;

receiving by the second terminal the communication data signal carrying the data packet to be processed, beginning by the second terminal to record a second number of pulses corresponding to the communication carrier signal received by the second terminal when the second terminal completes receiving the data packet to be processed, generating by the second terminal a response data packet based on the data packet to be processed;

sending, by the second terminal, the response data packet to the first terminal when detecting that the second number of pulses reaches a pulse number threshold N; and allowing, by the first terminal, to begin receiving the response data packet when detecting that the first number of pulses is within a threshold range, wherein the threshold range is obtained by the first terminal based on the pulse number threshold N.

12. The method according to claim 11, wherein, before sending by the first terminal the communication data signal carrying the data packet to be processed, the method further comprises:

generating by the first terminal a communication request, and sending by the first terminal the communication request to the second terminal;

receiving by the second terminal the communication request, generating by the second terminal a first negotiation data packet based on the communication request, and sending by the second terminal the first negotiation data packet to the first terminal;

receiving by the first terminal the first negotiation data packet, performing by the first terminal an authentication operation on the second terminal based on the first negotiation data packet, and after the authentication succeeds, generating by the first terminal a second negotiation data packet, and sending by the first terminal the second negotiation data packet to the second terminal;

receiving by the second terminal the second negotiation data packet, performing by the second terminal an authentication operation on the first terminal based on the second negotiation data packet, and after the authentication succeeds, generating by the second terminal the pulse number threshold N, encrypting by the second terminal the pulse number threshold N to generate a pulse number threshold ciphertext, and sending by the second terminal the pulse number threshold ciphertext to the first terminal, wherein N≤λ, and λ is the number of pulses generated when the communication carrier signal goes through a frame waiting time defined by a communication protocol adopted by the first terminal and the second terminal;

receiving by the first terminal the pulse number threshold ciphertext, decrypting by the first terminal the pulse number threshold ciphertext to obtain the pulse number threshold N, and storing by the first terminal the pulse number threshold N.

13. The method according to claim 11, wherein, the pulse number threshold N is stored in factory preconfigured information of the first terminal and of the second terminal, wherein N≤λ, and λ is the number of pulses generated when the communication carrier signal goes through a frame waiting time defined by a communication protocol adopted by the first terminal and the second terminal.

14. The method according to claim 11, wherein, the first terminal and the second terminal perform data interaction based on a pulse communication protocol, and perform a verification operation on the received pulse number threshold N based on a tamper-proof check value, wherein the pulse communication protocol is a communication protocol in which transmission data at least comprises the pulse number threshold N; or the pulse communication protocol is a communication protocol in which transmission data at least comprises the pulse number threshold N and the tamper-proof check value, the tamper-proof check value is configured to perform the verification operation on the pulse number threshold N;

the pulse number threshold N is generated by the first terminal based on ω, and N≥ω, in which ω is the number of pulses generated when the communication carrier signal goes through a predetermined completion time period of processing by the second terminal the received data from the first terminal, or the pulse number threshold N is generated by the first terminal negotiating with the second terminal, in which the negotiating comprises: the first terminal generating N and sending N to the second terminal, the second terminal sending a response message to the first terminal after the second terminal successfully authenticates the first terminal; or the second terminal generating N and sending N to the first terminal, the first terminal sending a response message to the second terminal after the first terminal successfully authenticates the second terminal; or the first terminal generating N1 and sending N1 to the second terminal, the second terminal generating N2 and sending N2 to the first terminal, the first terminal and the second terminal respectively generating the N by using N1 and N2 based on the same algorithm.

15. The method according to claim 11, wherein, a communication manner adopted by the first terminal and the second terminal comprises: a short distance wireless communication manner; the first terminal is a reader, and the second terminal is a transponder.

16. The method according to claim 11, wherein, the threshold range is [N, N+2n], wherein N+2n≤λ, and λ is the number of pulses generated when the communication carrier signal goes through a frame waiting time defined by a communication protocol adopted by the first terminal and the second terminal, and n is the number of pulses generated when the communication carrier signal goes through a maximum communication distance defined by a communication manner adopted by the first terminal and the second terminal.

* * * * *